(12) United States Patent
Boys

(10) Patent No.: US 6,726,074 B2
(45) Date of Patent: Apr. 27, 2004

(54) MOUNTABLE MODULAR UTILITY STORAGE TRAY

(75) Inventor: Mark A. Boys, Aromas, CA (US)

(73) Assignee: SoundStarts, Inc., Aromas, CA (US)

( * ) Notice: Subject to any disclaimer, the term of this patent is extended or adjusted under 35 U.S.C. 154(b) by 0 days.

(21) Appl. No.: 09/912,152

(22) Filed: Jul. 23, 2001

(65) Prior Publication Data

US 2003/0015883 A1 Jan. 23, 2003

(51) Int. Cl.⁷ .................................................. B60R 9/00
(52) U.S. Cl. ........................ 224/482; 224/485; 224/545; 224/547; 224/555; 224/558; 224/565
(58) Field of Search ................................ 224/482, 485, 224/545, 547, 555, 558, 565, 566; 296/37.1; 108/44, 46, 137, 144.11, 146, 147.14, 147.18; 206/557, 549, 223, 362, 315.11; 220/495.01, 495.03, 495.06, 23.9, 505, 516, 528, 558

(56) References Cited

U.S. PATENT DOCUMENTS

| | | | | |
|---|---|---|---|---|
| 4,202,465 A | * | 5/1980 | McLaren | 229/120.17 |
| 4,741,441 A | * | 5/1988 | Keffeler | 206/532 |
| 5,002,215 A | * | 3/1991 | Gregoire | 224/277 |
| 5,133,455 A | * | 7/1992 | Chow | 206/374 |
| 5,152,440 A | * | 10/1992 | Chao | 224/277 |
| 5,263,578 A | * | 11/1993 | Narvey | 206/232 |
| 5,294,026 A | * | 3/1994 | McGirt | 224/482 |
| 5,494,308 A | * | 2/1996 | Southerland | 280/33.992 |
| 5,788,072 A | * | 8/1998 | Chen | 206/372 |
| D399,985 S | * | 10/1998 | Hui | D12/419 |
| D415,995 S | * | 11/1999 | Kanehl, Jr. | D12/419 |
| 6,298,590 B1 | * | 10/2001 | Levinson | 211/89.01 |

FOREIGN PATENT DOCUMENTS

GB    2223935 A  *  4/1990  ............ A45C/7/00

* cited by examiner

Primary Examiner—Lee Young
Assistant Examiner—Maerena W. Brevard
(74) Attorney, Agent, or Firm—Donald R. Boys; Central Coast Patent Agency, Inc.

(57) ABSTRACT

A modular utility carrier to mount to a folded-down windshield assembly of a vehicle has a body tray having a length, width and height, the body tray formed by side walls and a bottom wall forming an upward-facing cavity, and a plurality of attachment assemblies connected to the body and having each an attachment interface to provide a releasable attachment to the folded-down windshield. Various embodiments are taught as well as methods.

21 Claims, 13 Drawing Sheets

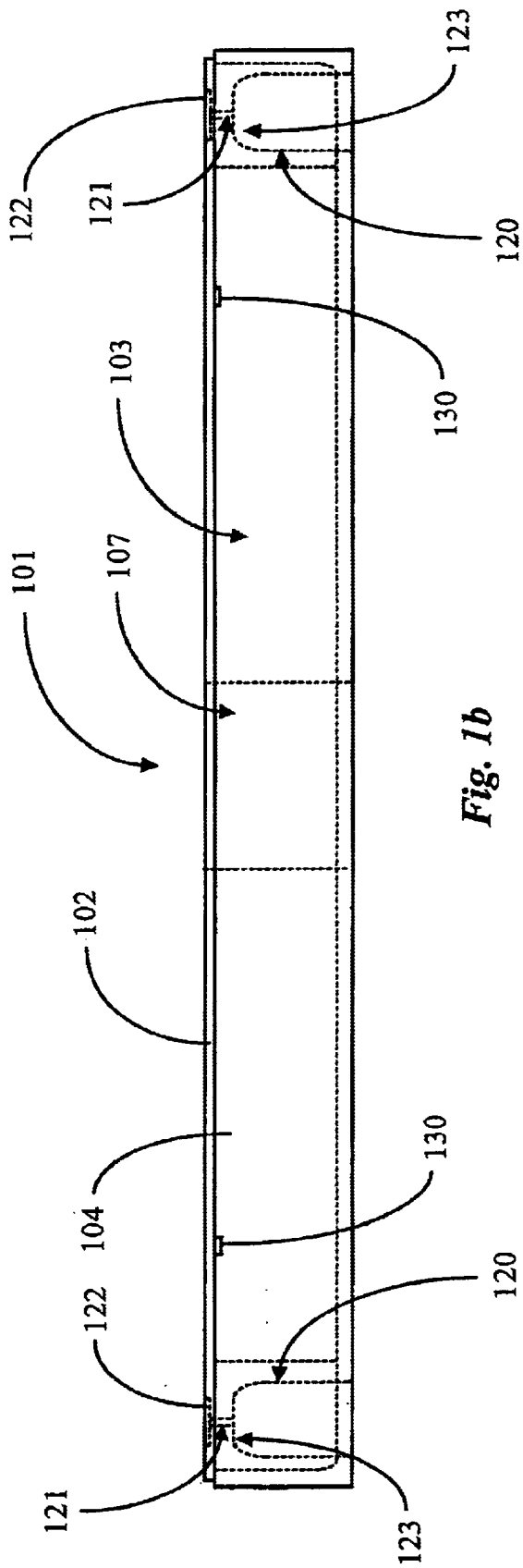
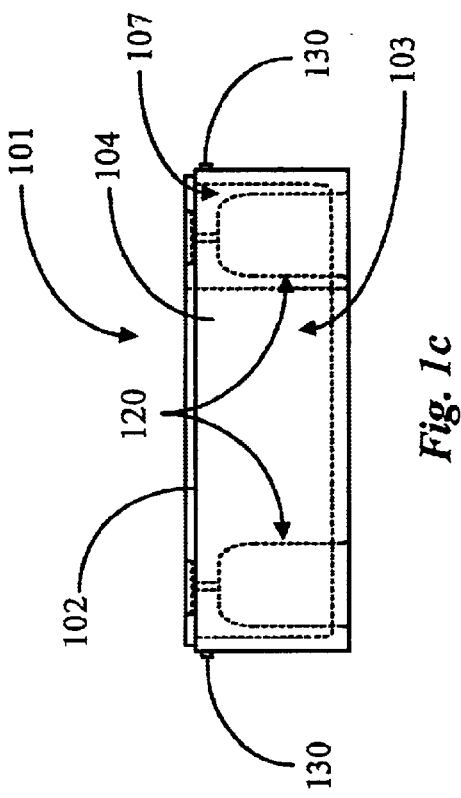
Fig. 1b
Fig. 1c

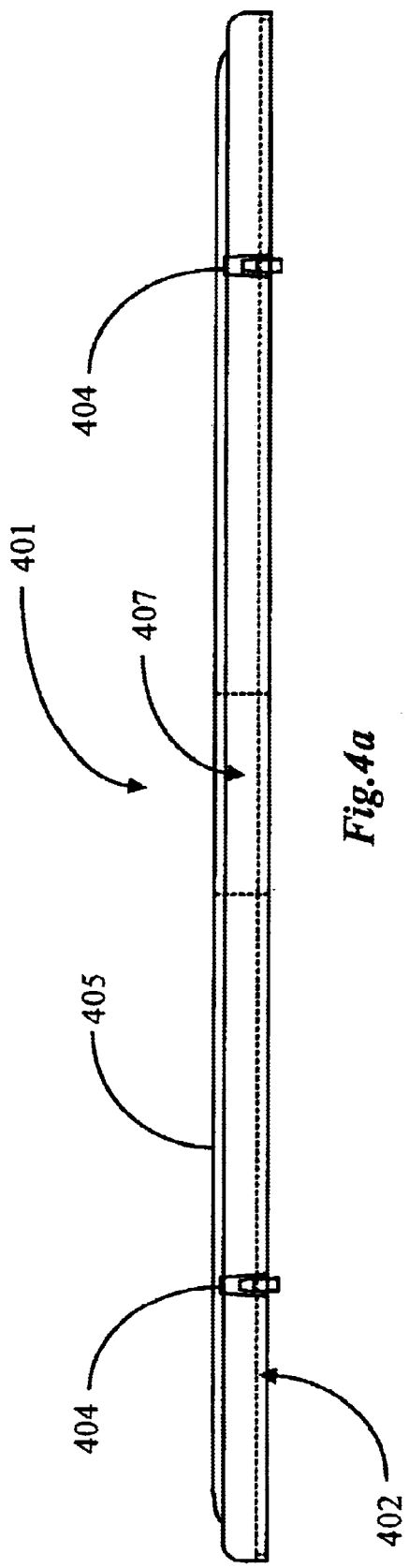

MOUNTABLE MODULAR UTILITY STORAGE TRAY

FIELD OF THE INVENTION

The present invention is in the area of supplemental storage and securing systems for items in a vehicle, and has particular use in off-road applications where quick and easy access to gear and equipment is required.

BACKGROUND OF THE INVENTION

Outdoor activities such as bird-watching, fishing, hunting, and the like often require many supplies, equipment and accessories in order for the enthusiast to be adequately supplied and prepared for the activity, particularly true for those activities requiring extended time and travel. Many different pairs of binoculars, cameras and guidebooks and other supplies, for example, are typically required for several people traveling to a remote bird-watching area, or a group of hunters and fishermen may often need to carry several different firearms and sets of fishing equipment in the vehicle in which their traveling. When carrying firearms in the vehicle it is desirable to be able to safely store and secure the firearms and supplies in such a way that the contents of the storage system are protected from severe impact, shock, vibration, and jarring often encountered when driving off-road, especially in undeveloped terrain. The ability to safely secure and store firearms and ammunition and protect the contents from such effects is particularly important for the obvious safety reasons, and is also necessary for avoiding the occurrence of movement and bumping of the firearm within the storage compartment, possibly causing sighting adjustments to the firearm or a mounted scope, or other settings to go out of adjustment.

It is also desirable in utility storage systems such as described to have an ability to quickly and easily access the contents or features of the system. For example, if a situation warrants it, hunters may wish to quickly retrieve a firearm, ammunition or other related gear or switch from one firearm to another, even while the vehicle in which they are traveling is in motion. Other users, such as wildlife photographers and bird watchers may need to quickly switch from one camera or one pair of binoculars to another, or have access to guide materials and such while the vehicle is following moving subjects.

A variety of vehicle item storage systems have been developed for providing secure, efficient storage of firearms and valuable equipment. A system well-known in industry comprises sliding drawer units adapted to fit and attach to the bed of a pickup truck, or in the area of the rear storage compartment of a sport utility vehicle, for example. In such a system some of the drawers may be designed for storage of firearms, having separate compartments within a modular drawer unit, each compartment having a shape and size that accommodates the storage of one or more firearms which may or may not have a scope mounted, and may or may not be contained in a protective firearm carrier or sheath. Various other shapes and sizes of compartments are contained within each drawer of such a system for storing or securing a variety of odd-shaped articles, gear, supplies and other equipment.

Conventional utility storage systems such as the sliding drawer system of current art described above are typically designed and marketed for installation and use in a specific type of vehicle, one type for a sport utility vehicle and another for a pickup truck for example. In many of these cases the systems are designed to be for use only with a particular model of vehicle, having dimensions enabling it to securely fit into the area in which it is being installed in a vehicle, leaving little tolerance in dimensions. A problem presented in such a conventional storage system, however, is that a user is prevented from transferring the storage system from one model of vehicle to another, such as when the use of another vehicle is required to reach the destination and the replacement vehicle is not properly equipped with adequate protective and secure storage for the firearms or other equipment and gear to be transported. The user will also typically be prevented from transferring the storage system from a vehicle of a particular model and year of manufacture, to a second vehicle of the same model but manufactured in a different year.

Permanent or semi-permanent installation at the rear of the vehicle, or under a seat or bench within the vehicle, is typically the method utilized for conventional storage systems of current art, presenting a further problem that limits the ability of the user to utilize the system in another vehicle, even a vehicle of the same model and year, and further limits the ability to safely secure and transport a wide variety of gear and equipment used specifically for a given activity. For example, firearms, ammunition and other related gear and equipment require a storage system with features, storage compartment shapes and dimensions and other specific capabilities for safely securing, storing or utilizing such items. Conversely, bird-watching or wildlife photography requiring other specific equipment such as binoculars and cameras and related gear and supplies, require a completely different storage compartment configuration and level of lockable security, for example, while at the same time providing sensitive equipment with protection from jarring impacts, shock and vibration. An obvious storage problem is presented for a user wishing to utilize a storage system in a vehicle to properly transport specific gear and equipment related to fishing or hunting, for example, and then utilize the same vehicle and storage system for only transporting equipment related to wildlife photography or bird-watching, for example.

What is clearly needed is a vehicle utility storage system that safely, securely and efficiently stores and secures a wide variety of gear and equipment of varying shapes and sizes, while allowing a user to quickly and easily change the configuration, size, or other aspects of the storage compartments or functions of the storage system, and achieve a condition best suited for the specific gear and equipment related to the activity. Such a system should be simple, lightweight and compact, and capable of being utilized in vehicles of various models and years of manufacture by being easily transferable from one vehicle to another. Such an improved utility storage system should make the most efficient use of the storage space where it is installed, while providing the contents or apparatus within ample protection from shock, vibration, and impact to gear and equipment. An improved utility storage systems such as described is preferably low-cost and economical and easy to manufacture, and when installed in the host vehicle, should provide the driver or passengers of the vehicle with a greatly improved level of access to gear, supplies, equipment or apparatus stored or provided by the system, eliminating the need to stop and exit the vehicle, or to awkwardly reach under seats, benches or into other remote areas of the vehicle in order to gain access to the contents. Greatly improved access provided by such a system would give the user an ability to quickly and easily retrieve equipment, making quick switches possible between different cameras, firearms, or binoculars, for example, all stored and secured in the same area by the same system. Such improved access should be provided by such a system regardless of whether or not the host vehicle is in motion, or of the extent of external forces imposed upon the vehicle while it is in motion, even during travel over rough terrain.

An improved utility storage system having all of the attributes described above, and more, is provided by the inventor, and embodiments of the invention are described below in enabling detail.

SUMMARY OF THE INVENTION

In a preferred embodiment of the invention a modular utility carrier to mount to a folded-down windshield assembly of a vehicle is provided, comprising a body tray having a length, width and height, the body tray formed by side walls and a bottom wall forming an upward-facing cavity, and a plurality of attachment assemblies connected to the body and having each an attachment interface to provide a releasable attachment to the folded-down windshield. In a preferred embodiment the attachment assemblies comprise clamp mechanisms to clamp to bar elements of the folded-down windshield. In some embodiments the attachment assemblies further comprise elongation mechanisms allowing the body tray to be positioned above the folded-down windshield at variable heights. In these and other embodiments the attachment assemblies further comprise resilient mounting elements to at least partially shield the body tray from forces caused by movement of the vehicle.

In some embodiments the body tray comprises a plurality of compartments shaped and equipped to carry or store one or more elements of gear related to a specific activity. In some cases the activity is hunting, and the elements comprise at least one firearm used in hunting. The carrier may further comprise one or more tip-up gun rests for steadying a firearm during shooting, and a tip-up steadying bar for a passenger in a vehicle to grasp while standing. In some cases the activity is wildlife observation, and the elements comprise one or more of binoculars and cameras. In some preferred embodiments individual ones of the compartments comprise one or more of protective linings, vibration damping elements, and fastening components for holding the elements in place.

In certain embodiments the carrier further comprises an insert tray shaped and sized to fit snugly within the upward-facing cavity of the body tray, such that insert trays are interchangeable in the body tray. In these embodiments there may also be vibration-dampening elements interposed between the body tray and the insert tray. Further the insert tray may comprise a plurality of compartments shaped and equipped to carry or store one or more elements of gear related to a specific activity. The specific activity may be hunting, in which case the elements comprise at least one firearm used in hunting. Also the specific activity may be wildlife observation, and the elements may then comprise one or more of binoculars and cameras.

In preferred embodiments individual ones of the compartments comprise one or more of protective linings, vibration damping elements, and fastening components for holding the elements in place. There may further be a plurality of secondary tray modules shaped to fit into and be carried by the insert tray, individual ones of the secondary tray modules shaped and equipped to store one or more elements related to an activity.

In some of these embodiments the activity is hunting, and the elements comprise at least one firearm used in hunting.

In other embodiments the activity is wildlife observation, and the elements comprise one or more of binoculars and cameras. The individual secondary tray modules may comprise one or more of protective linings, vibration damping elements, and fastening components for holding the elements in place.

In addition to all of the embodiment above, the carrier may also comprise a lid closure shaped and equipped to close the cavity and protect articles within the cavity from exposure to conditions outside the carrier. The lid may be secured to the tray body by latch elements and be completely removable, or it may be implemented in a number of different ways.

In another aspect of the invention a method for carrying miscellaneous articles for a user of a vehicle having a windshield assembly that may be folded down over a hood area of the vehicle is provided, comprising the steps of (a) forming a body tray having a length, width and height, the body tray formed by side walls and a bottom wall forming an upward-facing cavity; (b) affixing attachment assemblies to the body tray, each attachment assembly having an attachment interface to provide a releasable attachment to the folded-down windshield; (c) attaching the body tray to the folded-down windshield by the attachment interfaces; and (d) carrying the articles in the body tray for easy and rapid access by the user.

In some preferred embodiments, in step (c), the attachment assemblies comprise clamp mechanisms used to clamp to bar elements of the folded-down windshield. The attachment assemblies may further comprise elongation mechanisms allowing the body tray to be positioned above the folded-down windshield at variable heights, and further comprising a step for adjusting the position of the body tray over the folded-down windshield. Still further, the attachment assemblies may further comprise resilient mounting elements to at least partially shield the body tray from forces caused by movement of the vehicle.

In some embodiments the body tray comprises a plurality of compartments shaped and equipped to carry or store one or more elements of gear related to a specific activity. The activity may be hunting, and the elements comprise in that case at least one firearm used in hunting. In some embodiments the body tray may further comprise one or more tip-up gun rests for steadying a firearm during shooting, and the method further comprises a step for setting up and using an individual one of the gun rests.

In some embodiments the body tray further comprises a tip-up steadying bar for a passenger in a vehicle to grasp while standing, and the method further comprises a step for deploying and using the steadying bar. The activity may be wildlife observation, and the elements in that case comprise one or more of binoculars and cameras.

In preferred embodiments individual ones of the compartments comprise one or more of protective linings, vibration damping elements, and fastening components for holding the elements in place. There may further be an insert tray shaped and sized to fit snugly within the upward-facing cavity of the body tray, such that insert trays are interchangeable in the body tray. In these embodiments there may vibration-dampening elements interposed between the body tray and the insert tray.

In some cases of the method the insert tray comprises a plurality of compartments shaped and equipped to carry or store one or more elements of gear related to a specific activity. Where the activity is hunting the elements comprise at least one firearm used in hunting. Where the activity is wildlife observation, the elements comprise one or more of binoculars and cameras. In many cases individual ones of the compartments comprise one or more of protective linings, vibration damping elements, and fastening components for holding the elements in place.

In some preferred embodiments of the invention there may be a plurality of secondary tray modules shaped to fit into and be carried by the insert tray, individual ones of the secondary tray modules shaped and equipped to store one or more elements related to an activity. In many of these cases the activity is hunting, and the elements comprise at least one firearm used in hunting. In other cases the activity is wildlife observation, and the elements comprise one or more of binoculars and cameras.

In preferred embodiments individual ones of the secondary tray modules comprise one or more of protective linings, vibration damping elements, and fastening components for holding the elements in place. There may also be a lid closure shaped and equipped to close the cavity and protect articles within the cavity from exposure to conditions outside the carrier, and the lid may be secured to the tray body by latch elements and be therefore completely removable.

In embodiments of the present invention taught in enabling detail below, for the first time an ability is provided to especially outdoor-oriented people to very conveniently carry and have immediate access to many articles related to any activity. Carriers are organized into systems that allow maximum flexibility.

BRIEF DESCRIPTION OF THE DRAWING FIGURES

FIG. 1b is a front elevation view of the modular carrier of FIG. 1a.

FIG. 1c is a side elevation view of the modular carrier of FIG. 1a.

FIG. 4a is a side elevation view of a cover for the modular utility storage system of FIG. 1a according an embodiment of present invention.

FIG. 4b is a plan view of the modular utility storage system cover of FIG. 4a.

FIG. 6b is a plan view of the leg extender assembly of FIG. 6a.

DESCRIPTION OF THE PREFERRED EMBODIMENTS

The present invention in various embodiments overcomes an inherent inability in conventional vehicle utility storage systems to provide secure and organized storage for articles within a vehicle, that provides passengers within the vehicle, particularly the driver of the vehicle and a front passenger, quick and easy access to the articles, without the need for stopping or exiting the vehicle to gain access to the articles. A new and novel mounting method and apparatus is presented that, when utilized with the vehicle utility storage system as presented by the inventor, enables a mounting location on the vehicle that provides the user with quick and easy access to the contents of the utility storage system, as compared to conventional utility storage systems. The present invention also overcomes an inherent inability in conventional systems to protect the stored contents within the system from shock, vibration, and sudden impact that often occurs during operation of a vehicle, particularly when the vehicle is operated on bumpy roads or in an off-road driving situation. Furthermore, the present invention provides the user with a greatly improved level of flexibility by allowing the user to quickly and easily change the size, shape and configuration of the storage system to best suit the articles to be stored or secured, and also by allowing the user to easily transfer the utility storage system of the present invention from one like vehicle to another, regardless of model, make or year.

Figure 1A:
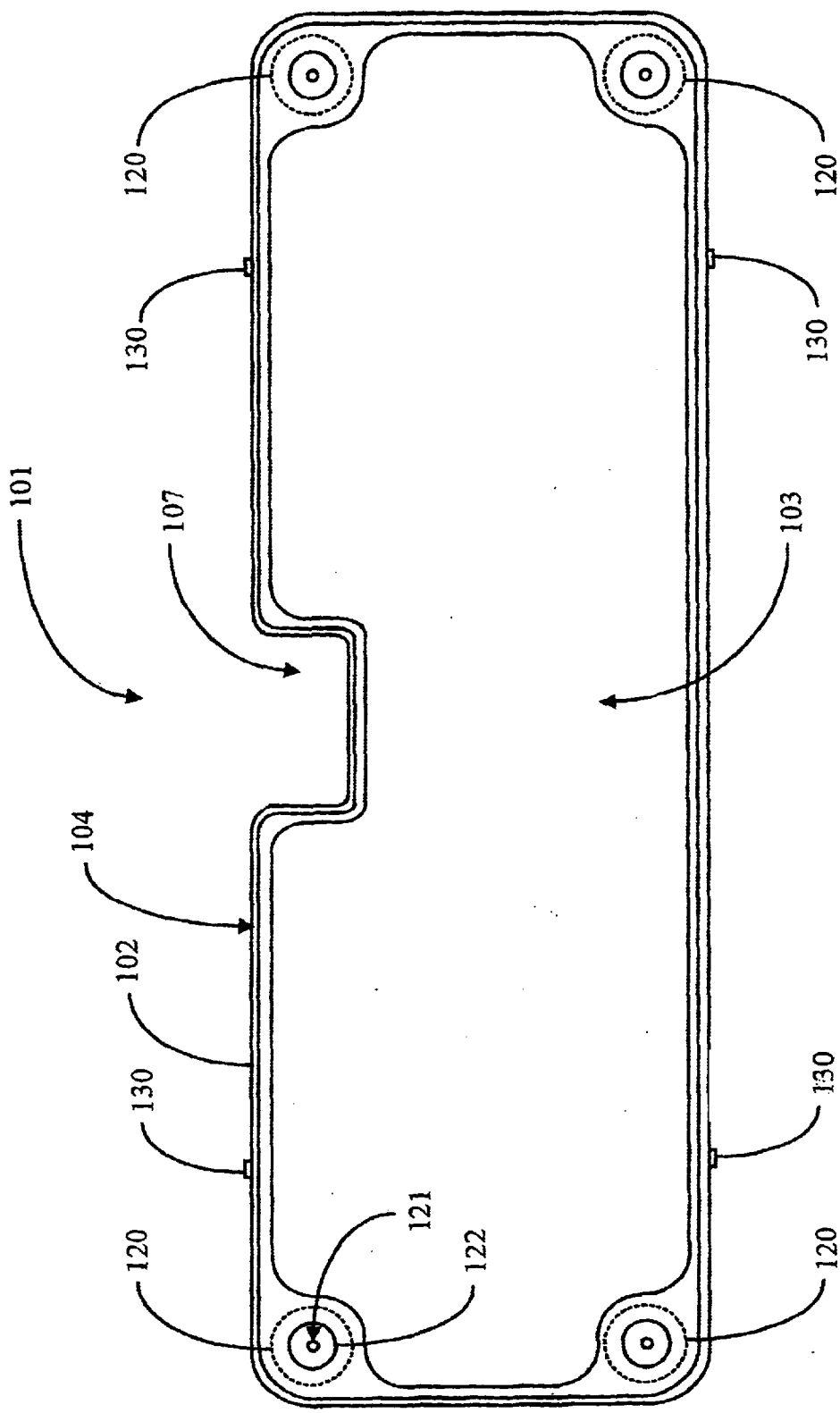
FIG. 1a is a plan view of a modular carrier for a utility storage system according to an embodiment of the present invention

FIG. 1a is a plan view of a modular carrier for a utility storage system according to an embodiment of the present invention. Modular carrier 101 is provided by the inventor as a rectangular box-shaped apparatus designed to mount to a front windshield or roll bar that has been folded down from a vertical to a horizontal position on the hood of the vehicle, as is possible with off-road vehicles of many makes, models and years of manufacture. Modular carrier 101 in a preferred embodiment has a length approximately equal to, or slightly longer than the width of the hood of a conventional off-road vehicle, such as a Jeep or similar vehicle, an overall width of approximately 24 inches, and a height of about 6 to 8 inches in a preferred embodiment. Although these dimensions can vary in alternative embodiments of the present invention, it has been determined by the inventor that the dimensions noted are well suited for the purpose and function of the preferred embodiment.

Modular carrier 101 has a body 104 manufactured of a strong, lightweight, resilient material such as polyethylene plastic, fiberglass reinforced polyurethane, or other similar material, and is molded or otherwise formed in a sturdy, one-piece construction. In alternative embodiments of the present invention some other strong, lightweight material may be used in manufacture such as aluminum or other lightweight metal alloy, and the method of manufacture may also vary according to the materials used.

Body 104 in this embodiment has a ridge 102 that is molded, milled or otherwise formed along the upper edge of body 104 completely encircling the periphery of body 104, ridge 102 having the purpose of providing a secure rest for a box cover lid as is shown later in detail. A total of four latch tabs 130 are positioned in this embodiment in a rectangular pattern on body 104; two latch tabs 130 located on the front side of body 104, and the other two latch tabs 130 located on the back side of body 104. Latch tabs 130 are provided in this embodiment to provide a securing point for latches on a box cover lid as is also shown later in more detail. Body 104 has an interior recess 103 forming a cavernous area within body 104 that is of a depth approximately one-half to one inch less than the overall height of body 104. The purpose of interior recess 103 is to provide the area necessary for accommodating the contents, which will be modularly stored and secured by modular carrier 101.

A mirror clearance cut-out 107 is molded, milled or otherwise formed into body 104 with a length and width slightly larger than that of a typical rear-view mirror used in many off-road vehicles, the mirror typically being mounted to the upper center position of the windshield of the vehicle. Mirror cut-out 107 is provided to allow the mounting of modular carrier 101 to the front roll bar or windshield assembly of a vehicle having such a rear-view mirror, so that clearance is provided between the mirror and body 104. In alternative embodiments, however, a mirror cut-out 107 may be omitted, such as for embodiments for use with many older vehicles having a rear view mirror mounted at the side of the vehicle instead of on the windshield in the upper center position as previously described.

A new and novel method and apparatus for mounting modular carrier 101 to the front folded-down roll bar or windshield assembly of the vehicle is facilitated by mounting seats 120, which are cylindrical voids drilled, milled or otherwise formed into body 104, each with a domed top portion, and extending up from the bottom of body 104 at each of the four corners of body 104 in this embodiment. Mounting seats 120 have a diameter of approximately four inches in this embodiment and are identical in size and shape, each extending up through body 104 to a height approximately one-half to one inch less than that of the total height of body 104. In alternative embodiments the dimensions of mounting seats 120 may vary, as can the total number of mounting seats, without departing from the scope and spirit of the present invention. For example, a greater number of mounting seats may be located on each side of body 104, or the diameter and height of each mounting seat 120 may vary slightly.

A mounting hole 121 is located at the center of each mounting seat 120, and is drilled or otherwise formed completely through the thickness of the material of body 104 that exists between the domed top of mounting seat 120 at its center, and the upper surface of body 104. The purpose of mounting holes 121 is for allowing passage of a fastening device down through body 104 for fastening body 104 to a mounting apparatus that will be utilized for each mounting seat 120. A countersink 122 is molded, milled or otherwise formed into the thickness of material between the upper surface of body 104 and the domed top of each mounting seat 120, and is also centered above each mounting seat 120, as with mounting holes 121. The purpose of counter sink 122 is to accommodate the fastening device to be used, in one embodiment a hand screw to be described ion some detail later in this specification, such that when the hand screw is fully inserted through mounting hole 121 and tightened into a securing hole of a mounting apparatus within mounting seat 120, the upper surface of the hand screw will be left relatively flush with the upper surface of body 104, and ample room will exist between the outer edges of the hand screw and a circumference of counter sink 122.

FIG. 1b is a front elevation view of modular carrier 101 of FIG. 1a. The depth and length of interior recess 103 are shown by dotted lines, the depth extending down from the top edge of body 104 to approximately one-half to one inch above the bottom edge of body 104, providing a floor at the bottom of interior recess 103 of approximately that thickness. In alternative embodiments the depth of interior recess 103 may be greater or less, depending upon the size and shape of the articles it is designed to carry. For example, one embodiment of the present invention may utilize a modular carrier designed to carry a storage module for a firearm that is positioned upright and lengthwise, requiring a deeper interior recess 103, while another alternative embodiment may utilize a shallower interior recess for accommodating modules designed for holding binoculars or cameras for example, sacrificing interior recess capacity for a thicker, stronger floor at the bottom of interior recess 103.

The shape and dimensions of mounting seats 120 can be clearly seen in this view, as can the dome shape of the top portion of each cylindrical void formed by mounting seat 120. A center portion of the dome shape of the top portion of each mounting seat 120 is flattened to form a mounting surface 123, against which the top of a mounting apparatus will rest when fastened to body 104 in embodiments of the invention. The height of each mounting seat 120 is shown extending up from the bottom edge of body 104 of modular carrier 101 to within one-half to one inch below the upper surface of body 104, as described in FIG. 1a. Mounting holes 121 can be seen in their center position passing completely through the material of body 104 that exists between mounting surface 123 and the upper surface of body 104. Counter sink 122 is shown in this view to extend down from the upper surface of body 104 to a depth equal to approximately one-half the height of ridge 102, also clearly seen in this view. Two of the four latch tabs 130 can be seen from this perspective located just below the bottom edge of ridge 102, positioned at about equal distances from the outer ends of body 104. Mirror cut-out 107 is shown by dotted lines to be positioned at the center of the edge of body 104 opposite to the facing front edge seen in this view.

FIG. 1c is a side elevation view of modular carrier 101 of FIG. 1a. Again, the depth of interior recess 103 is clearly seen, as is the shape of mounting seats 120 and their dimensions in relation to that of body 104. Mirror cut-out 107 is shown by dotted lines to be positioned on the back side of body 104, and ridge 102 can be seen extending on the viewed side from the front to the back of body 104. Latch tabs 130 can also be seen in this view positioned both on the front and back side of body 104. It must be noted that in alternative embodiments of the present invention various methods other than described thus far may be utilized for providing a protective covering to modular carrier 101. For example, instead of utilizing a rigid lid cover that rests upon ridge 102 and is latched to body 104 utilizing latch tabs 130, a retractable cover apparatus, of length equal to that of body 104 and attached to the top edge of the back side of body 104, may be utilized comprising a detachable, spring loaded rolling mechanism containing a flexible material that may be pulled out from the attached rolling mechanism and attached at the top edge of the front side of body 104. Other types of covers may include solid, hinged lids with possibly one or more latching or locking mechanisms, flexible material covers that are affixed to the edges of the upper surface of body 104 by Velcro or some other attaching method such as common snaps, for example, or some other method to completely cover the upper surface of body 104 and protect the contents within.

Figure 2:
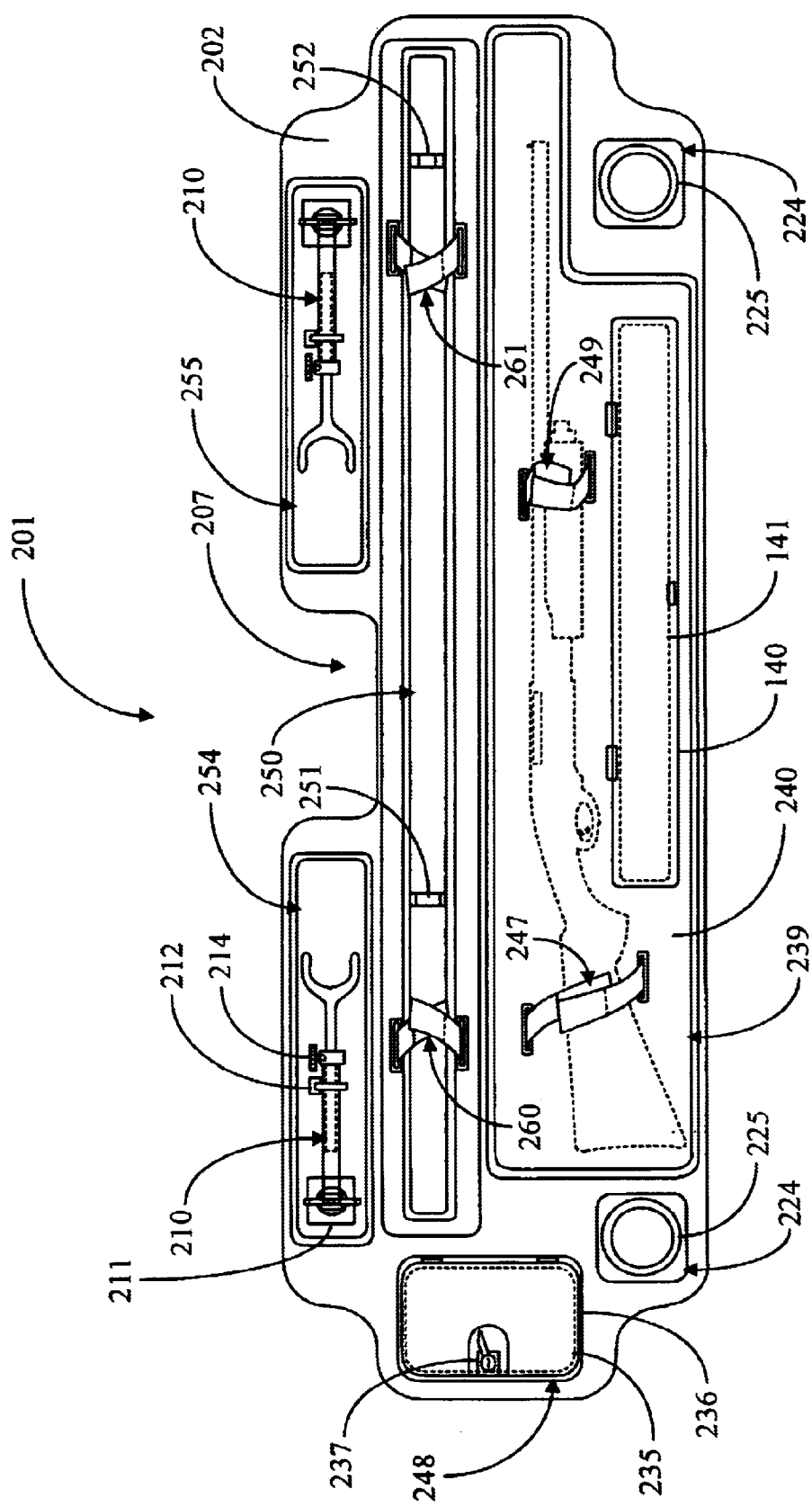
FIG. 2 is a plan view of a modular housing insert according to an embodiment of the present invention.

FIG. 2 is a plan view of a modular housing insert 201 according to an embodiment of the present invention. Modular housing insert 201 is provided in this embodiment as a solution to the inherent inability of conventional vehicle utility storage systems to offer flexibility to the user who wishes to easily change the shape, size and configuration of the various storage compartments, or modules, for the articles to be stored. Modular housing insert 201 is designed to be inserted into interior recess 103 of modular carrier 101 of FIG. 1a, such that once inserted, modular housing insert 201 fits snugly into interior recess 103 of modular carrier 101, with little or no play between the outer circumference of modular housing insert 201 and the inner wall of interior recess 103. Modular housing insert 201 comprises a body 202 having a shape following that of interior recess 103 of modular carrier 101 as shown in FIG. 1a. The outer periphery of body 202, however, is slightly smaller than that of the inner walls of interior recess 103, such that once inserted a snug fit is achieved.

Modular housing insert 201 also has a region 207 that, when modular housing insert 201 is inserted into interior recess 103 of modular carrier 101, follows the shape of mirror cut-out 107 (FIG. 1a). As previously described for modular carrier 101 of FIG. 1a, alternative embodiments of the present invention may not utilize a mirror cut-out 107, such as for embodiments designed for use with older off-road vehicles having the rear-view mirror mounted at the side of the vehicle instead of at the upper center portion of the windshield.

The height of body 202 is about equal to the depth of interior recess 103, so that when modular housing insert 201 is inserted into interior recess 103 of modular carrier 101 with bottom surface of body 202 resting upon the upper surface of the floor of interior recess 103, the upper surface of body 202 is about flush with the upper surface of body 104 of modular carrier 101. In this way, when modular housing insert 201 rests within interior recess 103, a number of types of covers may be used in various embodiments that will completely cover the contents of modular housing insert 201 while at the same time providing a protective seal along the upper surface of body 104 of modular carrier 101.

In a preferred embodiment body 202 is manufactured of strong, resilient lightweight material similar to that used for body 104 of modular carrier 101. In alternative embodiments a very strong, lightweight foam material may be used in the manufacture of body 202. In other alternative embodiments a layer of softer, more flexible foam material may be adhered to the bottom surface of a body 202 manufactured of strong material such as plastic, body 202 having a thickness that is reduced to accommodate the thickness of the foam material. In such a way, when body 202 is inserted into interior recess 103, the softer foam layer adhered to the bottom surface of body 202 may act as a shock-absorbing medium that provides additional protection from shock, impact or vibration to sensitive gear or equipment which may be contained by body 202.

One purpose of the invention is to provide the user with the flexibility to quickly and easily change the size, shape, configuration and capacity of the storage capabilities of the utility storage system utilized in the vehicle. Such flexibility is especially desirable to users that may prefer to travel to a destination and engage in one activity one day, and then travel to another destination for another activity the next day. For example, a user who wishes to safely and securely transport gear and equipment specifically required for the outdoor activity of hunting, may require storage for multiple firearms, ammunition, cleaning rods, and other articles related to the activity. If the same user wishes to do bird-watching, the required gear and equipment may include multiple binoculars, cameras, field guides, and so on. Both activities require gear and equipment of vastly different shapes, sizes and securing requirements, and for such a user, it is highly desirable to have the ability to quickly reconfigure the vehicle utility storage system to safely secure and transport the two very different sets of gear and equipment.

In the example of FIG. 2, modular housing insert 201 is designed for safely securing and storing equipment and gear specifically related to the activity of hunting or shooting. Body 202 has multiple recesses formed into body 202 creating multiple cavities into which secondary modules of various shapes and sizes are inserted and snugly fitted. Some of the various secondary modules are designed for holding and securing specific gear or equipment, while other modules may be utilized for other, less specific purposes. In this example maximum flexibility is provided to the user utilizing a vehicle utility storage system comprising modular housing insert 201, by allowing the user, having only one mounted modular carrier 101, to not only to switch from one activity-specific modular housing insert to another, but to switch to different secondary modules within one modular housing insert 201.

A module 239 is provided in this embodiment as a separate removable module designed for securing a firearm positioned lengthwise to body 202 and lying on its side. Straps 247, utilizing a known Velcro closure system in this example, are attached below, or to the upper surface of module 239, and serve to secure the firearm to the surface of module 239 at the butt end of the firearm. Straps 249, also utilizing a Velcro closure system, secure the forearm portion of the firearm to the surface of module 239. The Velcro closure system utilized by both straps 247 and straps 249 allow the user to snugly secure different firearms having different dimensions at either or both strapping areas. Such a securing system also allows the user, with a modular storage system mounted on the vehicle according to the invention, to quickly un-strap and remove the firearm from module 239 without leaving driver's seat. Module 239 in this embodiment is lined with felt or some other soft, protective non-scratching covering 240 in order to protect the finish of the firearm as it lays on its side secured by straps 247 and straps 249, and also to provide vibration dampening.

Module 239 is designed to accommodate firearms of different lengths and sizes, and also allows room for firearms with a mounted scope or other sighting apparatus. Module 239, in this example, also has a compartment 141, which in other embodiments may also be a removable module within module 239. Compartment 141 is relatively long and narrow in shape to accommodate secure storage of gun barrel cleaning rods or other related items such as cleaning fluids, cloths and the like. A hinged lid 140 covers compartment 141 which, when closed, snaps shut over compartment 141 utilizing standard closure methods, thereby protecting the contents within from outside elements as well as preventing the items from falling out during rough travel. In other embodiments of the present invention module 239 may be removed and replaced with another module designed for safely securing a number of handguns, for example, and the size and shape of module 239 or compartment 141 may differ greatly, or compartment 141 may be omitted altogether to allow for a greater number of handguns to be secured by the replacement module.

A removable module 250 is provided in this example for securing an additional firearm such as a rifle or shotgun, and has straps 260 and straps 261, both also utilizing a Velcro closure system as in module 239, for securing firearm at the butt end as well as the forearm end of the firearm. Module 250 is designed to accommodate and secure a firearm in the upright position, lengthwise along the length of body 202 as shown in the example. To protect the extreme ends of the secured firearm, namely the lower corner of the butt section, and the tip of the barrel, a rear notched support 251, and a forward notched support 252 are provided to support those areas respectively. The inner walls of module 250 are lined with felt or other similar protective material covering similarly to module 239, as are notched support 251 and notched support 252. Additionally, as is true for module 239, module 250 is a removable module which can be replaced by a different module designed for securing a firearm of a different size or shape, or may be replaced with a module designed for securing items other than a firearm.

Positioned forward of module 250, a pair of modules 254 and 255 are shown, each positioned on either side of region 207. Each module 254 and 255 in this embodiment is designed for housing a gun rest 210. The orientation of modules 254 and 255 provides both the driver and the front passenger of the vehicle onto which the modular storage system comprising modular housing insert 201 is mounted, access to a gun rest on each respective side. Gun rest 210 is attached to module 254 by swivel base 211, and is designed to fold down within module 254 when not in use. Once folded down, gun rest 210 is secured by a latch 212, thereby preventing it from swinging upward. Once unlatched, gun rest 210 is allowed the swing upward until it is fully vertical where it locks in place by a mechanical locking mechanism (not shown) within swivel base 211. While gun rest 210 is locked in place in its upright vertical position, swivel base 211 allows gun rest 210 to swivel clockwise or counter clockwise depending upon the direction of aim chosen by shooter. A mechanical release mechanism within swivel base 211 (also not shown) releases the locked gun rest so that it may be folded down again when no longer needed. The notched upper portion of gun rest 210 upon which the firearm rests slides in and out of the lower tubular shaft of gun rest 210. To extend the length of gun rest 210 the upper notched portion slides outward and can be locked in place within the lower tubular section by manually tightening hand screw 214. As with previous modules thus far described for modular housing insert 201, modules 254 and 255 are removable modules and may be replaced with other modules designed for housing other equipment or containing other various items.

A module 248 in this example is also a removable module housing a secured, lockable storage compartment suitable for safely storing ammunition or ammunition supplies, for example, and comprises a secure hinged lid with a handle lock 237, which is key-activated. The storage compartment within module 248 has a soft, protective felt-like inner lining, similar to that used for firearm modules 239 and 250, to further protect the contents within. Module 248, as with previously described modules, can be replaced with a different module containing a different storage compartment which may contain a different set of ammunition or supplies, for example, or may be replaced by a different module having an entirely different function altogether, depending on the configuration wishes of the user.

A pair of modules 224 is also shown in this example, each module 224 located on either side of module 239, and each containing an insulated cup holder insert 225. Modules 224 are located on body 202 such that easy access to each cup holder insert is afforded to the driver of the host vehicle and the front passenger of the vehicle. Cup holder inserts 225 are also removable and may be designed with a reusable cooling liner comprising a re-freezable substance such as blue ice, as is known in the art, or some other well-known reusable cooling technology. Also, cup holder inserts 225 may utilize removable circular inserts of various sizes positioned at the bottom of each cup holder insert so that a variety of cup shapes and sizes may be securely held by cup holder inserts 225. Or, other modules containing cooling cup holders of varying sizes may be used to replace the removable cup holder module 224.

Figure 3:
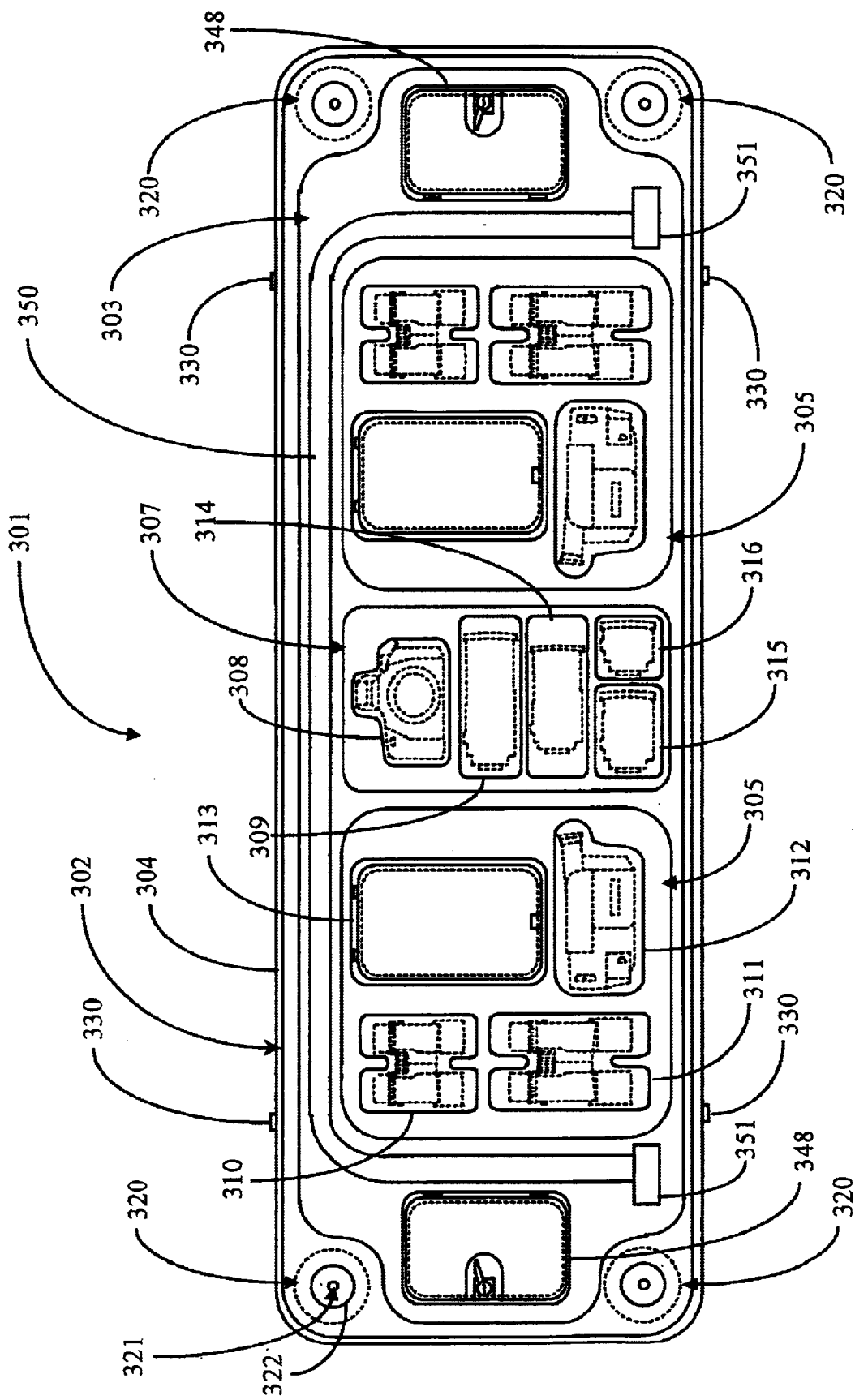
FIG. 3 is a plan view of a modular utility storage system according to an alternative embodiment of the present invention.

FIG. 3 is a plan view of a modular utility storage system 301 according to an alternative embodiment of the present invention. In this example storage system 301 is presented to further illustrate the versatility of the modular vehicle storage system in embodiments of the present invention. Storage system 301 comprises an alternative modular carrier 302 and modular housing insert 303, both having a shape and outer dimension similar to modular carrier 101 of FIG. 1a and modular housing insert 201 of FIG. 2, with the exception of the omission of a cut-out section for a rear view mirror. In this alternative embodiment the modular housing insert 303 is shown inserted into an internal recess formed within modular carrier 302, similarly to that previously described for modular carrier 101 and modular housing insert 201. Storage system 301 is designed for use with older off-road vehicles having the rear view mirror mounted to the side of the vehicle instead of attached to the upper center portion of the windshield or windshield frame assembly, as is common with later-model vehicles. The example presented by FIG. 3 is a modular storage system having components designed for safely securing gear and equipment specific to bird-watching or possibly wildlife photography.

Modular carrier 303 has a ridge 304 similar to ridge 202 of modular carrier 101 of FIG. 1, and similarly encircles the periphery of modular carrier 303, for the purpose of providing a ridge upon which a cover lid such as described earlier for modular carrier 101 may rest. A total of four latch tabs 330 are also incorporated in this embodiment similarly to those for modular carrier 101 of FIG. 1, for providing a securing stop for latches of a cover lid. However, as with modular carrier 101 of FIG. 1, a variety of lockable or non-lockable covers such as previously described may be used to protect the contents stored by storage system 301, thereby eliminating the need for ridge 302 or latch tabs 330 altogether. The storage system covering method may vary greatly depending upon the preference of the user and nature of contents stored by the system.

A total of four mounting seats 320, identical in size and shape to mounting seats 120 of modular carrier 101, are provided for modular housing insert 302 for the purpose of providing a secure seat for a set of four adjustable mounting apparatus as are described below in greater detail. Each mounting seat 320 also has a mounting hole 321 and counter sink 322 for accommodation of a fastening device for attaching modular carrier 303 to the adjustable mounting apparatus seated within mounting seats 320, just as previously described.

In this example a total of three removable secondary modules are contained within three internal recesses formed into modular housing insert 302. Located in the center of modular housing insert 302 is a modular insert 307 having its own multiple removable secondary modules for various equipment related to photography. A removable module 308 has the purpose, in this embodiment, of containing an SLR camera body, and is provided with a protective felt-like inner lining similar to other modules previously described. Below module 308 are modules 309, 314, 315 and 316, all having the purpose of safely housing and securing SLR lenses of varying focal powers and sizes, and all also having a protective felt-like inner lining the protect the delicate instruments for which they are designed.

Bordering modular insert 307 is a pair of removable modular inserts 305, identical to one other and also having their own removable secondary modules, each designed to hold a specific piece of related gear or equipment. Modular inserts 305 each have a removable module 310 and 311 for holding and securing two separate pairs of binoculars, each of a different size and focal power, a removable module 312 for holding and securing a camcorder, and a larger removable module 313 located above module 312, containing a storage compartment with a hinged lid. Various items such as field guides, reference materials and other related supplies may be stored within the compartment of module 313. In this example, the storage capabilities and configuration provided to the driver of the vehicle hosting storage system 301, are duplicated for the passenger of the host vehicle, as shown in this view. Additionally, a pair of identical removable modules 348, similar in form and function to module 248 of FIG. 2, each containing lockable storage compartments operated with a key, are provided in this embodiment, modules 348 located on either end of modular housing insert 302. In this way, both the driver and front passenger of the host vehicle have easy access to a lockable storage compartment for storing and securing a variety of items.

As shown for body 104 of modular carrier 101 of FIG. 1a, a ridge 302 is provided for the purpose of providing a seat for a sturdy, rigid cover for protecting the contents contained within the modules of modular carrier 303, and latch tabs 330 also are shown for the purpose of securing such a cover to modular carrier 303. In this embodiment modular housing insert 302 has a hand rail 350 manufactured of tubular steel or some other strong, lightweight and rigid material. Hand rail 350 is u-shaped and attached to modular housing insert 302 utilizing a pivoting mounting interface 351 on each mounting end. Mounting interfaces 351 allow hand rail 350 to swing upward into a vertical position, and, although details are not given here, also have a mechanism for securely locking hand rail 350 into the vertical position. With storage system 301 mounted to the folded-down roll bar windshield of the vehicle, and hand rail 350 locked into the vertical position, the driver or front passenger of the vehicle may stand within the vehicle and obtain support by grasping the extended hand rail 350 at any position. This is particularly useful for a front passenger of the vehicle who wishes to stand in the vehicle, while it in motion, to obtain a better view of the surroundings or terrain, for example.

FIG. 4a is a side elevation view of a cover (lid) for the modular utility storage system of FIG. 1a according an embodiment of present invention. Lid 401 is illustrated as one of many alternative types of covers that may be used for modular carriers such as modular carrier 101 of FIG. 1a, and modular carrier 303 of FIG. 3. Lid 401 is manufactured of strong, resilient material such as plastic, various polymers or possibly cast or stamped from aluminum or some other similarly strong, rigid, lightweight material. Lid 401 in this example has a mirror cut-out 407, similar in size and location to mirror cut-out 107 of modular carrier 101, and is designed to be used with modular carrier 101. Continued clearance for a rear-view mirror mounted on the windshield of the host vehicle is provided in this manner when box lid 401 is positioned upon, and fastened onto modular carrier 101.

A ridge 402 is formed along the inner wall of the bottom of box lid 401 for the purpose of mating snugly with ridge 102 of modular carrier 101 when box lid 401 is positioned upon ridge 102. A total of four lid clasps 404, only two of which are seen in FIG. 4a, are standard buckling clasps having the purpose of providing any easily-releasable securing apparatus for attaching lid 401 to carrier 101. A plurality of ribs are molded, attached or otherwise formed into lid 401 for the purpose of adding strength and stability to the structure of lid 401, and run parallel with length of lid 401.

Figure 4B:
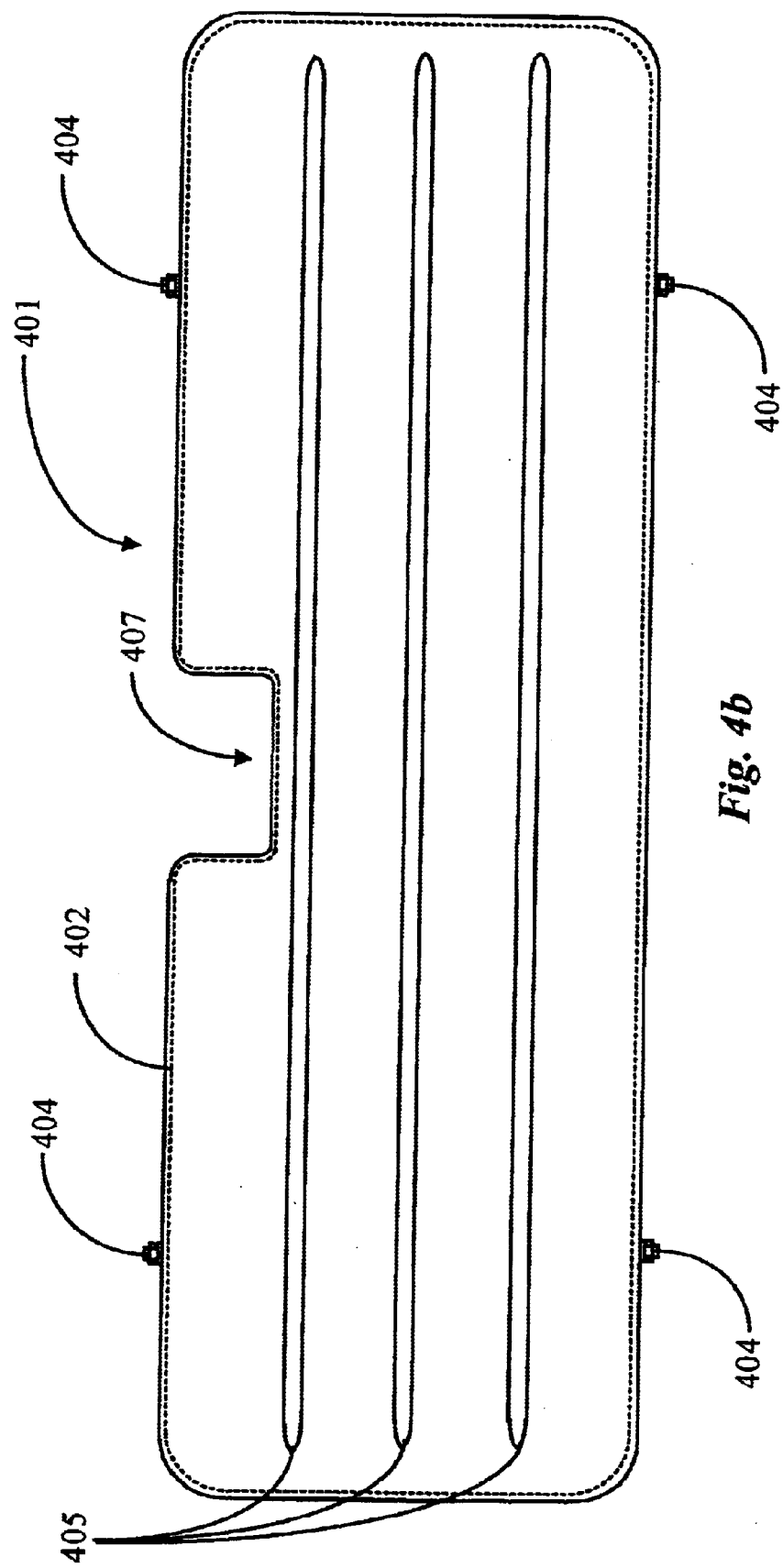

FIG. 4b is a plan view of lid 401 of FIG. 4a. In this view the dimensions of the periphery of lid 401 can be seen to be roughly identical to those of the periphery of modular carrier 101 of FIG. 1a. Mirror cut-out 407 can also be seen in its center location which is also identical to location of mirror cut-out 107 for modular carrier 101 of FIG. 1a. Ridge 402 can be seen in dotted line around the periphery of lid 401, and the plurality of reinforcing ribs 405 can also be clearly seen in this view. A total of four lid clasps 404 are shown, a pair located on either side of box lid 401, each located in the exact same spot in relation to the dimensions of box lid 401, as are the location of the four latch tabs 130 of modular carrier 101 in relation to its dimensions. When lid 401 is properly positioned and seated upon modular carrier 101 all four lid clasps 404 align with the four latch tabs 130 of modular carrier 101, so that lid clasps 404 may squarely and securely attach lid 401 to modular carrier 101 by attaching to latch tabs 130 of carrier 101.

As previously described, a variety of different types of covers may be used for a modular carrier such as modular carrier 101 of FIG. 1a or modular carrier 303 of FIG. 3, and, in some cases, a modular carrier cover may be omitted entirely without departing from the overall scope and spirit of the invention. The figures shown and described for box lid cover 401 are exemplary only, having the purpose of simply illustrating one type of the many different types of covers that may be used (or not used) in various embodiments of the present invention.

A solution that overcomes an inherent inability in conventional vehicle utility storage systems to provide a secure, efficient, organized and flexible storage system for articles within a vehicle, that provides passengers within the vehicle quick and easy access to the articles stored or secured by the system, has been clearly illustrated and described above in enabling detail as preferred embodiments of the present invention. Solutions have also been shown and described in embodiments herein that overcome another inherent inability of conventional vehicle utility storage systems to allow a user the desired flexibility of having the ability to change the size, shape and configuration of the capabilities of the vehicle storage system, as well as the ability to easily and quickly transfer the vehicle utility storage system from one vehicle to another with minimal impediments.

As is now shown in the following figures and descriptions, the present invention, in alternative embodiments, also overcomes an inherent inability in conventional systems to provide the stored contents within the system adequate protection from shock, vibration, and sudden impact that often occurs during operation of the vehicle, particularly when the vehicle is operated on bumpy roads or in an off-road driving situation. Such achievements are possible utilizing a new and novel method and apparatus for mounting the vehicle utility storage system described above to the front fold-down roll bar or windshield assembly of an off-road vehicle. Embodiments of the present invention that accomplish these means are described and depicted below in enabling detail.

Figure 5B:
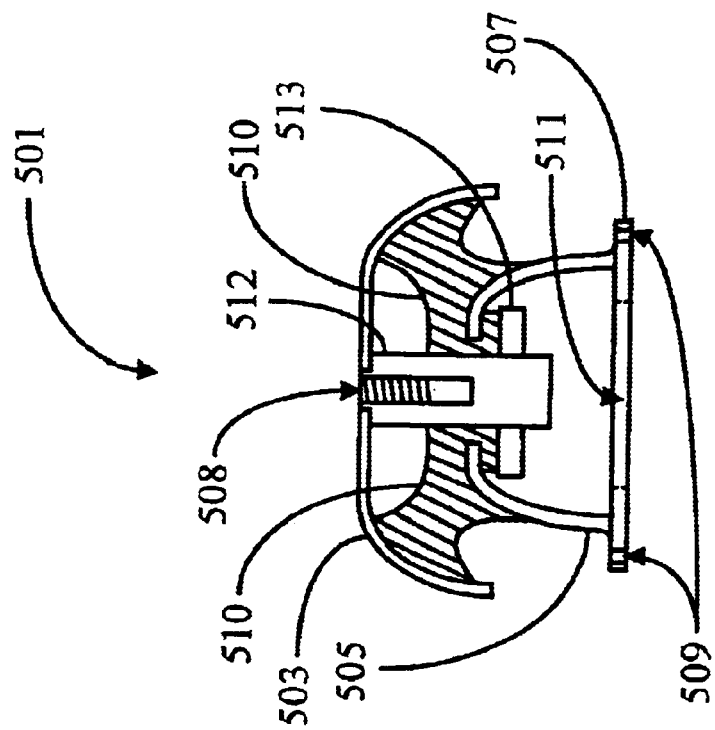
FIG. 5b is a cross-section view of the elastomeric mounting interface of FIG. 5a FIG. 6a is an elevation view of a leg extender assembly.
Figure 5A:
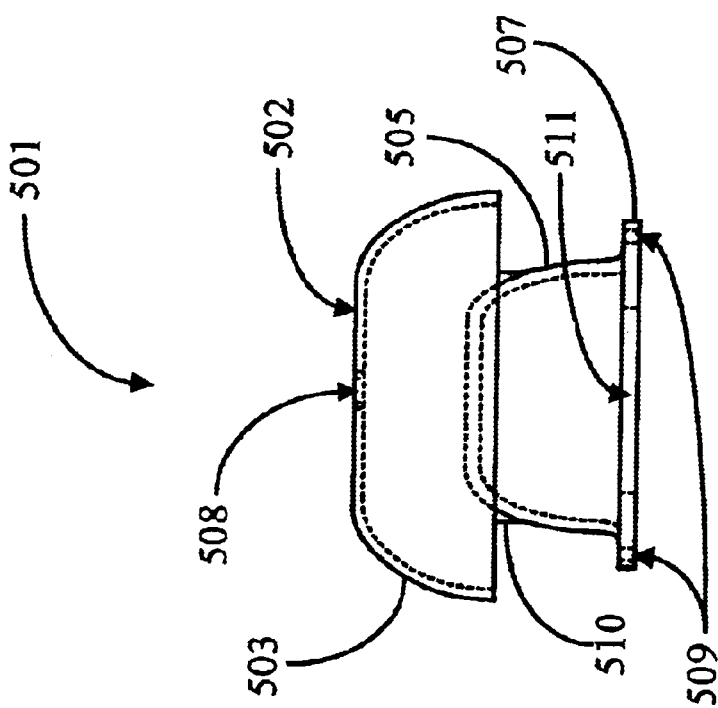
FIG. 5a is an elevation view of a modified elastomeric mounting interface.

FIG. 5a is elevation view of a modified elastomeric mounting interface that is used in conjunction with other standard assemblies to be shown to form a vibration-dampening clamp-mount system in embodiments of the present invention. Mounting interface 501 is a vibration-dampening mounting apparatus utilizing an elastomer insert, provided in such a way, as is described below in detail, that it becomes a key part of an innovative vibration-dampening mounting system and method for attaching embodiments of a modular vehicle utility storage system, such as presented in embodiments of the present invention, to a folded-down front roll bar or windshield assembly of an off-road vehicle. The result is an adjustable, secure, versatile shock and vibration-resistant mounting system ideally designed for use with the modular vehicle utility storage systems described herein. Mounting interface 501 comprises the main elements of an upper mounting surface, a lower base with a permanently attached mounting flange, and an elastomeric interface positioned between the lower base and the upper mounting surface.

Cap 503, being the upper mounting portion of mounting interface 501 in this embodiment, utilizes a flattened top surface forming mounting surface 502. The outline formed by cap 503 with mounting surface 502 designed to be identical to that of the upper-most inner surface of mounting seat 120 of modular carrier 101 of FIG. 1b, or to that of its identical counterpart, mounting seat 320 of modular carrier 303 of FIG. 3, as described previously. When cap 503 is fitted into the upper portion of mounting seat 120, a snug fit is achieved with minimal play in any direction. Centered within the flattened mounting surface 502 of cap 503 is a threaded hole 508 which is utilized for insertion of a fastening device such as a hand screw as described previously, for fastening modular carrier 101 to cap 503. Although it is not shown in this view, hole 508 is drilled down partially through the center of a larger shaft that extends down from mounting surface 502, through cap 503, extending below the lower straight edge of cap 503.

Base 505, serving as support for upper components, as well as the attaching surface for mounting interface 501, is also dome-like in shape, but modified in size so that its circumference is somewhat less than mounting flange 507. Base 505 is fixedly attached to mounting flange 507, which has also been modified in size to have a diameter slightly greater than base 505 and slightly less than cap 503. Cap 503 and base 505 with attached mounting flange 507 are made, in this embodiment, of a strong sturdy metal, such as cold-rolled steel or similarly strong, rigid material that is highly resistant to corrosion, oil, ozone and other detrimental effects caused by the environment and heavy or constant use.

User access to components within mounting interface 501 is achieved via another modification to mounting flange 507 resulting in a large flange hole 511 located in the center of flange 507, having a diameter somewhat greater than half that of flange 507. By utilizing flange hole 511 a user is capable of switching one elastomer insert for a different one having either a different size or durometer, or both, or to match a particular condition of the terrain through which the vehicle will travel, or conditions of the suspension of the vehicle, for example. A pair of threaded mounting holes 509 are located near the outer edge of flange 507, and each mounting hole 509 is located at direct opposite ends of flange 507, as can be seen in this view. The purpose of threaded mounting holes 509 is for attaching mounting interface 501 to the next lower component assembly of the innovative mounting method that will be subsequently described in detail.

Elastomer insert 510 within cap 503, is partially visible extending just below the lower flat edge of cap 503, and in current art is typically manufactured of high-grade neoprene or some other similarly flexible and resilient material.

FIG. 5b is a cross-section view of mounting interface 501 of FIG. 5a. A greatly enhanced view of the inner components of mounting interface 501 is provided in this cut-away section view, clearly showing the modified elastomer insert 510 as it meets with the inner curved surface of cap 503 an the outer curved surface of base 505 and supports it at a height that is significantly higher than a standard height for a mounting interface of this type and diameter. Elastomer insert 510 can also be clearly seen surrounding a majority of the lower half of shaft 512, a portion of elastomer insert 510 extending down through the open top of base 505 where it is secured in place against the upper, inner flat surface of base 505 with an elastomer clamp nut 513, which is also a modification when compared to those most common in the art. A user can detach elastomer clamp nut 513 from shaft 512 via the access provided by flange hole 511 which extends through mounting flange 507, pull the assembly of cap 303, elastomer insert 510 and shaft 512 upward from base 505, and replace the elastomer insert 510 with an insert of a different durometer in order to change the flexibility or resiliency of mounting interface 501 once it is reassembled. Detail of the assembly of elastomer clamp nut 513 to shaft 512 is greatly simplified in this exemplary view, and can be assumed to be a standard threaded nut or a set comprising a threaded nut and washer, attached to a threaded lower portion of shaft 512. In other embodiments, however, the method of clamping the lower portion of elastomer insert 510 that extends down through the opening in the upper portion of base 503 may be achieved utilizing various means and methods, without departing from the spirit of the present invention. Mounting holes 509 can also be clearly seen in this view extending completely through flange 507, located on opposite ends near the outer edge of mounting flange 507, and threaded hole 508 can also be clearly seen centered within shaft 512, extending down from flush with the flat, upper mounting surface of cap 503, ending at a approximately halfway through shaft 512.

Figure 6A:
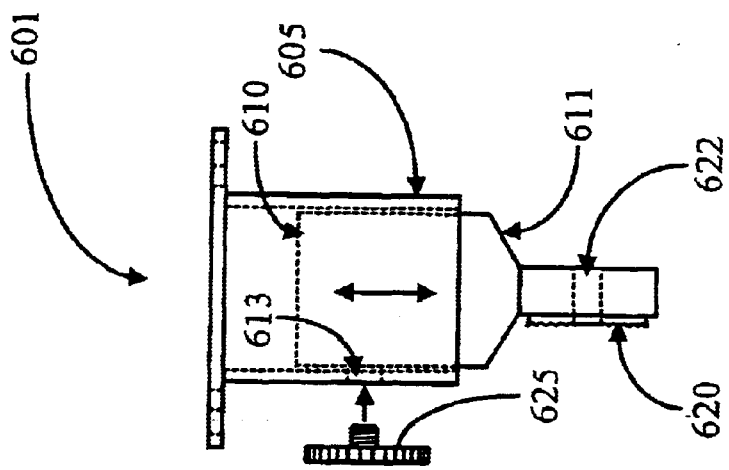

FIG. 6a is an elevation view of a leg extender assembly. Leg extender assembly 601, is illustrated in this embodiment as an adjustable interface serving as an integral connection between mounting flange 507 of mounting interface 501 of FIG. 5a, and a final clamping mechanism, shown below in detail, for making the final connection between a mounting seat 120 of modular carrier 101 (FIG. 1) and the front folded-down roll bar or windshield assembly of any vehicle onto which the modular storage system is mounted. Leg extender assembly 601 comprises an upper section 605, rectangular in shape and having a square body 606 that is hollow in the center, and a lower leg section 610, also somewhat elongated and rectangular in shape and also having a squared hollow body. Leg section 610 is designed to be inserted into body 606 in the direction indicated and to fit snugly within body 606, allowing only minimal lateral movement of leg section 610 within body 606, but at the same time allowing smooth upward or downward movement within body 606 of upper section 605. A mounting flange 607, similar in size, thickness and circular shape to mounting flange 507 of mounting interface 501 of FIG. 5a is located above, and permanently attached to the top of body 606. Mounting flange 607 has a pair of curved, elongated slots 609, only one of which is seen in FIG. 6a, positioned along opposite edges of mounting flange 607, extending completely through the thickness of mounting flange 607. The curved, elongated slots 609 allow a rotatable connection between extender assembly allowing the passage of a pair of attaching bolts, also shown later, that will extend upward through mounting flange 607 and screw into threaded mounting holes 509 of mounting interface 501 of FIG. 5a. A threaded hole 613 is located in a lower centered position on one side of body 606, and extends completely through body 606. The purpose of threaded hole 613 is to secure leg section 610 in place once inserted into body 606, utilizing a hand screw, the end of which, when tightened through threaded hole 613, applies pressure to one side of the inserted leg section 610, thereby holding it securely in place. In this manner, in order for a user to adjust the length of an assembled leg extender assembly, the user simply loosens the hand screw to relieve pressure on leg section 610, readjusts the position of leg section 610 within body 606, and upon re-tightening of the hand screw pressure is re-applied to the side of leg section 610, thereby locking leg section 210 into its new position.

A lower section 611 is provided for leg section 610, for the purpose of mounting a clamping assembly, also subsequently described later in detail. A circular, ridged mounting surface 620 facilitates a virtually unlimited rotatable, mounting capability for attaching a lower clamping assembly to lower section 611 of leg section 610, that, when attachment is complete, further rotation is greatly inhibited due to the ridges of mounting surface 620. A hole 622 extends completely through lower section 611 at the center of mounting surface 620, to facilitate the insertion of a mounting hand screw that is used to attach leg section 610 to a lower clamping assembly.

Figure 6B:
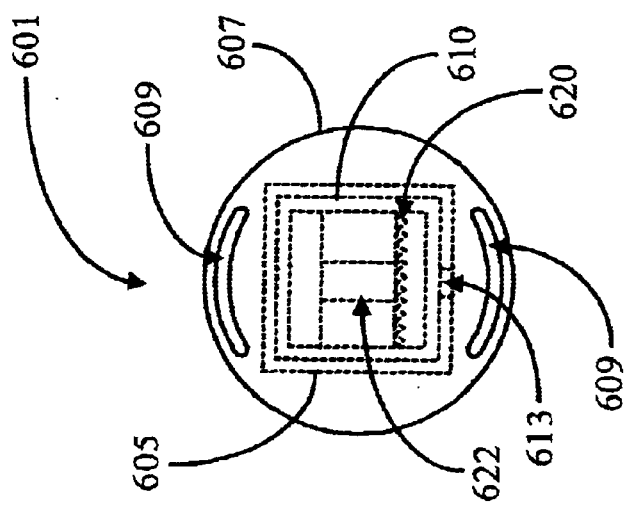

FIG. 6b is a plan view of leg extender assembly 601 of FIG. 6a, with leg section 610 inserted within body 606 according to an embodiment of the present invention. The circular shape of mounting flange 607, and the curved, elongated shape of both slots 609 can be clearly seen in this view. As is better illustrated here, the purpose of slots 609 is to facilitate rotatable adjustment between mounting flange 607 of leg extender assembly 601, and mounting flange 507 of mounting interface 501. In this manner, when attachment is complete utilizing attaching bolts inserted up through slots 609 from below into the threaded mounting holes 509 of mounting flange 507 of mounting interface 501, the relative position of the two assemblies is easily re-adjustable by simply loosening the two attaching bolts, rotating leg extender assembly to the new desired position, and re-tightening the attaching bolts into the threaded holes 509 of mounting flange 507. Although in this example only one pair of elongated slots 609 are used for mounting flange 607 to mounting flange 507 of mounting interface 501, which has only one pair of threaded holes 509 to accept the pair of attaching bolts, alternative embodiments of the present invention may include an additional set of elongated slots 609, threaded holes 509 and attaching bolts to add strength and stability to be assembled and attach leg extender assembly 601 and mounting interface 501.

The squared shape of body 606 of upper section 605, as well as that of the inserted leg section 610 can be seen here in the hidden view, as can the narrower, solid lower section 611 comprising mounting surface 620 and hole 622 extending completely through lower section 611 at the center of mounting surface 620. The ridges on one edge of lower section 611, forming mounting surface 620, can also be clearly seen in this view. Threaded hole 613 of body 606 of upper section 605 can also be seen in the hidden view extending completely through one side of body 606.

Figure 6C:
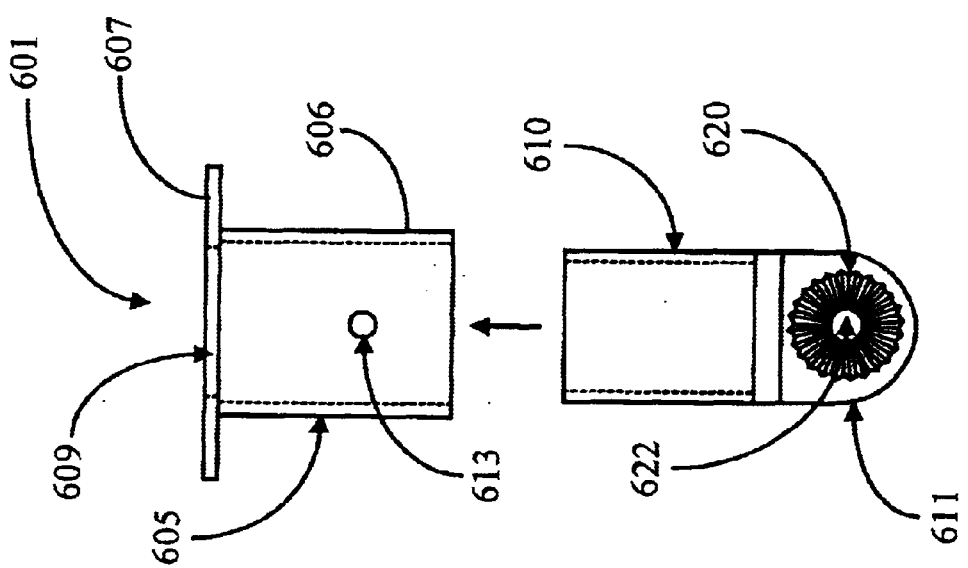
FIG. 6c is an elevation view of the leg extender components of FIG. 6a, and a standard hand screw.

FIG. 6c is an elevation view of leg extender assembly 601 of FIG. 6a, and a standard hand screw. In this view upper section 605 and leg section 610 of FIG. 6a are rotated clockwise together 90 degrees and assembled together with leg section 610 inserted up into upper section 605, and by utilizing a common hand screw 625 screwed into threaded hole 613 and tightened against the side of leg section 610, a secure adjustable attachment is achieved that is utilized within the mounting method and apparatus that is shown below for embodiments of the present invention. The shape of the narrower lower section 611, ridged mounting surface 620 on one edge of lower section 611, and hole 622 extending completely through lower section 611 are all clearly visible in this view. As can be seen, leg section 610 can be moved in an upward or downward direction as indicated, depending upon the overall length desired for the assembled leg extender assembly 601, and locked into position as desired.

Figure 7:
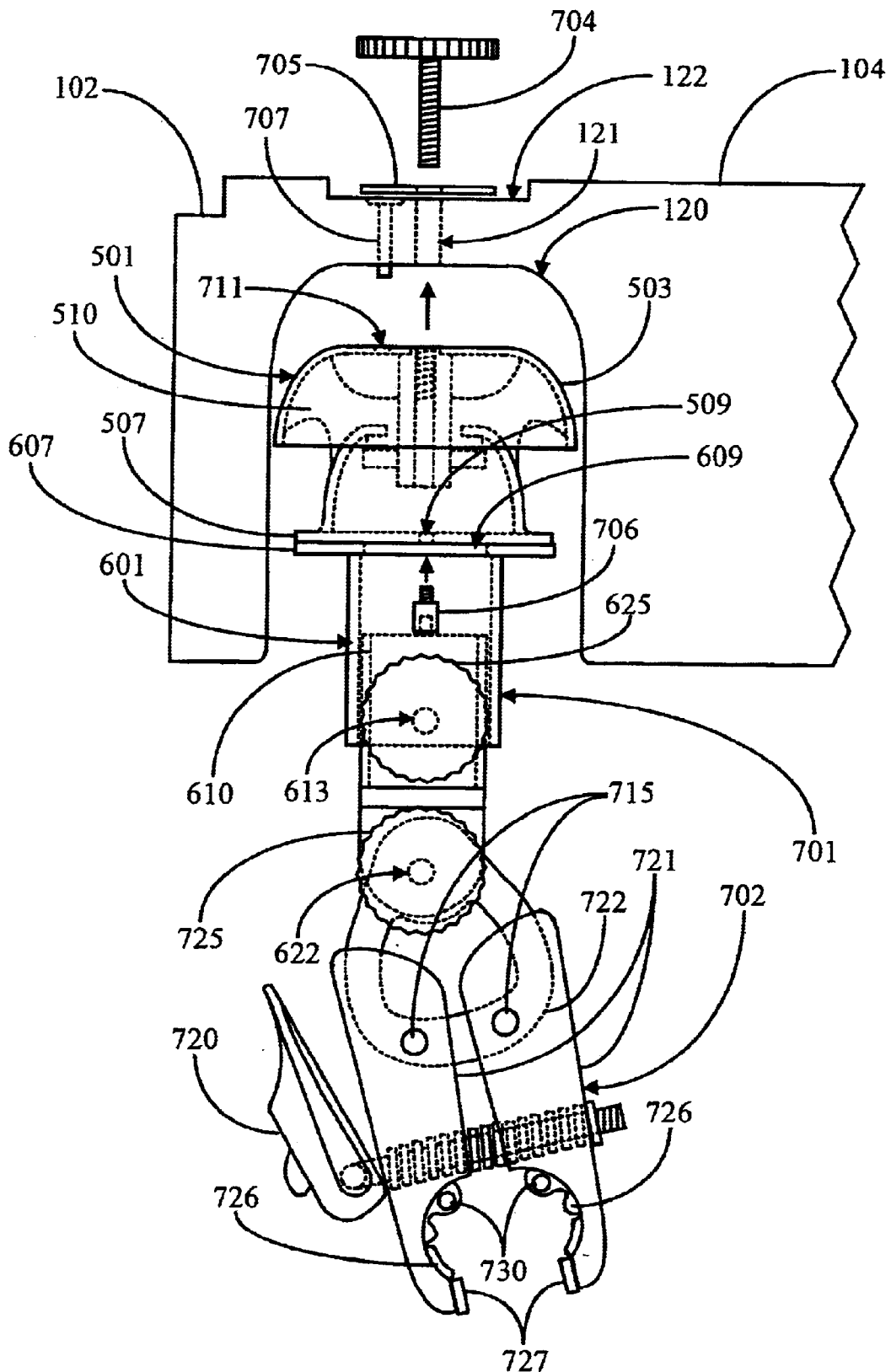
FIG. 7 is an elevation view of a clamp mount assembly comprising the elastomeric mounting interface of FIG. 5a, the leg extender assembly of FIG. 6c and a standard lockjaw assembly, assembled with a section of the modular carrier of FIG. 1a according to an embodiment of the present invention.

FIG. 7 is an elevation view of a clamp mount assembly comprising elastomeric mounting interface 501 of FIG. 5a, leg extender assembly 601 of FIG. 6c and a standard lock-jaw assembly, assembled with a section of modular carrier 101 of FIG. 1a according to an embodiment of the present invention. A broken section of one corner area of body 104 of modular carrier 101 of FIG. 1a is shown in this view containing a mounting seat 120 positioned directly over, and slightly above cap 503 of mounting interface 501. Hole 121 is shown extending through the section of body 104 directly above mounting interface 501, to allow passage of hand screw 704 during attachment. The enlarged view of mounting seat 120 shows greater detail of the attaching components comprising a standard hand screw 704 and washer 705. A further enhancement that adds stability by preventing rotation at the mounting attachment between mounting interface 501 and mounting seat 120 comprises a peg 707, manufactured of an extremely strong and lightweight material, with a flat head larger than the circumference of a hole 709 through which it is inserted. Hole 709 has a shallow counter sink slightly larger than the circumference of the head of peg 707, and slightly deeper than its thickness. Peg 707 has a shaft that is of a length slightly longer than that of hole 709, so that when fully inserted through body 104, the lower end of peg 707 protrudes slightly below the upper surface of mounting seat 120, and the head of peg 707 is slightly below the flush line of the bottom of counter sink 122. A standard washer 705 holds peg 707 in place during attachment. One or more holes 711 are drilled completely through the thickness of cap 503 of mounting interface, positioned so that when cap 503 is snugly and squarely seated into the uppermost position within mounting seat 120, a hole 711 can be perfectly aligned with the protruding end of peg 707, which will extend completely through the thickness of cap 503, thereby preventing its rotation within mounting seat 102 when attachment is complete.

Mounting interface 501 is attached to leg extender assembly 601 by attaching mounting flange 507 of mounting interface 501 to mounting flange 607 of leg extender assembly 601 utilizing a pair of standard bolts 706, inserted up through slots 609 of mounting flange 607 and into threaded holes 509 of mounting flange 507. As mentioned earlier, and as can be better visualized in this view, the rotatable attachment capability provided by elongated slots 609 enables the adjustability required, nearly 30 degrees of rotation in this embodiment, for a notably versatile mounting system.

Coupled to the attached mounting interface 501 and leg extender assembly 601 is a standard spring-loaded lockjaw assembly 702, utilizing a simple clamping well-known in the art. By attaching lockjaw assembly 702 to the attached mounting interface 501 and leg extender assembly 601, as has been described, clamp mount assembly 701 is formed. Lockjaw assembly 702 has a pair of jaws 721, pivoting on pins 715 of simple pivot bracket 722, designed for evenly and firmly holding onto tubular shapes. Once jaws 721 are positioned at a desired location on a front pull-down roll bar or windshield assembly, for example, and handle 720 is flipped to its clamp position, the solid and firm grip of jaws 721 is enhanced by the rubberized inner pads 726 lining each round gripping section of jaws 721.

Cylindrical rubber inserts 730 allow instant adjustability of the grip of lock jaw assembly 702 by inserting or removing the rubber inserts 730 in and out of holes provided in the rear, rounded sections of inner pads 726, such as is commonly practiced in the art. The end tips of jaws 721 are flattened similarly to those of vice grip pliers, and flat, rubberized end pads 727 are affixed the surfaces to provide an alternative clamping option, for instance, if a mounting height or location preference for modular carrier 101 makes it better to use one or more mounting locations of a shape other than tubular. To further enhance instant adjustability of the grip of lock jaws 721 upon the mounting area, rubber inserts 730 or end pads 727 may be replaced in various embodiments by other rubber inserts of different durometer, thickness, and so on, and in other embodiments inner pads 726 and end pads 727 may also be interchangeable and of varying durometer or thickness as well.

Pivot bracket 722 has a flattened mounting end that is of circular shape with a ridged mounting surface (not seen in this view) that is similar in size and shape to mounting surface 620 of FIG. 6a. In this configuration, with lock jaw assembly 702 mounted to leg extender assembly 601 and the ridged mounting surfaces of each facing together and interlocked, secure attachment is made by securing the mounting sections together utilizing standard hand screw 725 inserted through a centered hole extending completely through the mounting surface of pivot bracket 722, being secured at the opposite end utilizing a variety of standard methods, in this embodiment threaded hole 622 of leg extender assembly 601.

By utilizing the arrangement provided by the interconnection of mounting interface 501, leg extender assembly 601 and lock assembly 702 as shown in this view, a sturdy, versatile mounting apparatus with a high degree of adjustability results. Adjustability is greatly enhanced by the combination of the rotation capability provided by mounting flange 507 and 607 of mounting interface 501 and leg extender assembly 601, and extreme angles possible between leg extender assembly 601 and lock jaw assembly 702, exceeding a range of 180-degrees in this embodiment. An even greater range of adjustment angles are possible by adding additional holes 711 into cap 503 for insertion of a peg 707 allowing attachment of cap 503 to mounting seat 120 at virtually any angle, depending on the number and placement of holes 711 on cap 503. Utilizing the attributes and enhancements described mount assembly 701 is capable of performing well at any angle that may be encountered in a typical roll bar or windshield mounting situation such as has been described for embodiments of the present invention.

As described in FIG. 1a for modular carrier 101, a total of four clamp mount assemblies 701 are utilized for mounting modular carrier 104 to a horizontal windshield roll bar of a vehicle. Each vibration-dampening clamp mount assembly 701 maintains an excellent level of protection from impact, shear, vibration and shock to modules and their contents secured by the mounted modular carrier 101, achieved by the flexible and resilient properties of the modified elastomer insert 510 within each mounting interface 501. The softer durometer and modified dimensions of elastomer 510 in this design absorb a significant portion of forces transferred to lock jaw assembly 702 from the mounting location while the vehicle is in motion, particularly useful during travel over rough terrain. Depending upon the effectiveness of the suspension system of the host vehicle, the user may wish to customize a set of clamp mount assemblies with a different set of elastomer inserts 510 of different dimensions or durometers, or both, to compensate for any abnormal or excessive external forces.

In other alternative embodiments of the present invention an adjustable, multi-pivoting securable mounting interface may be installed between mounting interface 501 and leg extender assembly 601, or an alternative extender assembly may be utilized having two or even more pivot points, or a combination of pivot points and rotating plates may be utilized to again expand the capabilities and flexibility of the mounting system described.

Figure 8:
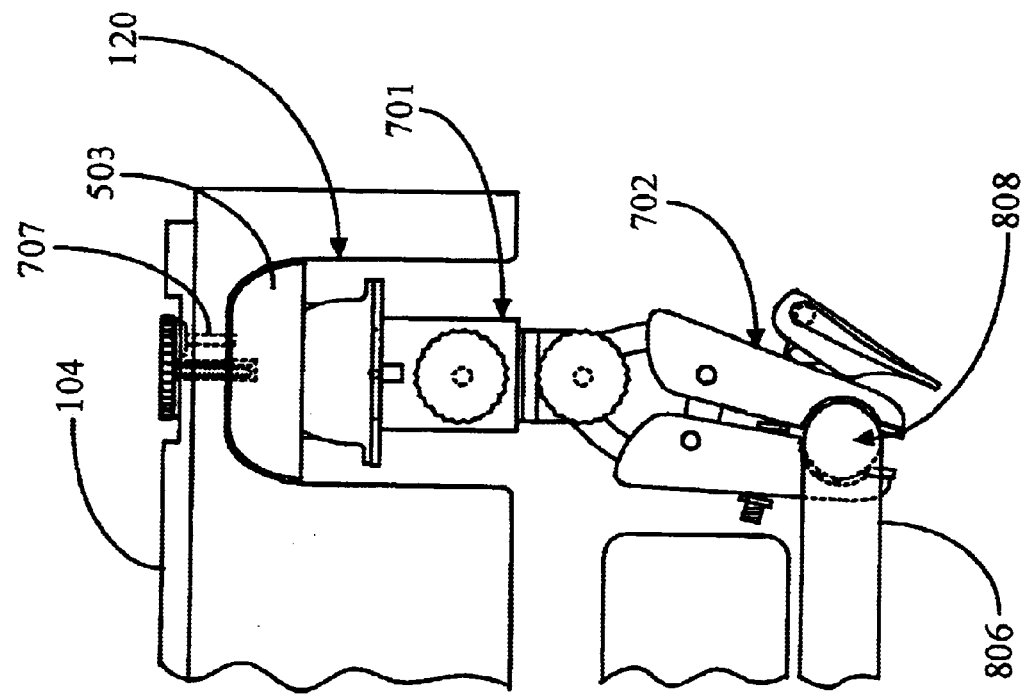
FIG. 8 is a broken elevation view of two clamp mount assemblies of FIG. 7 attaching the modular carrier of FIG. 1a to a roll bar windshield assembly according to an embodiment of the present invention.
Figure 8:
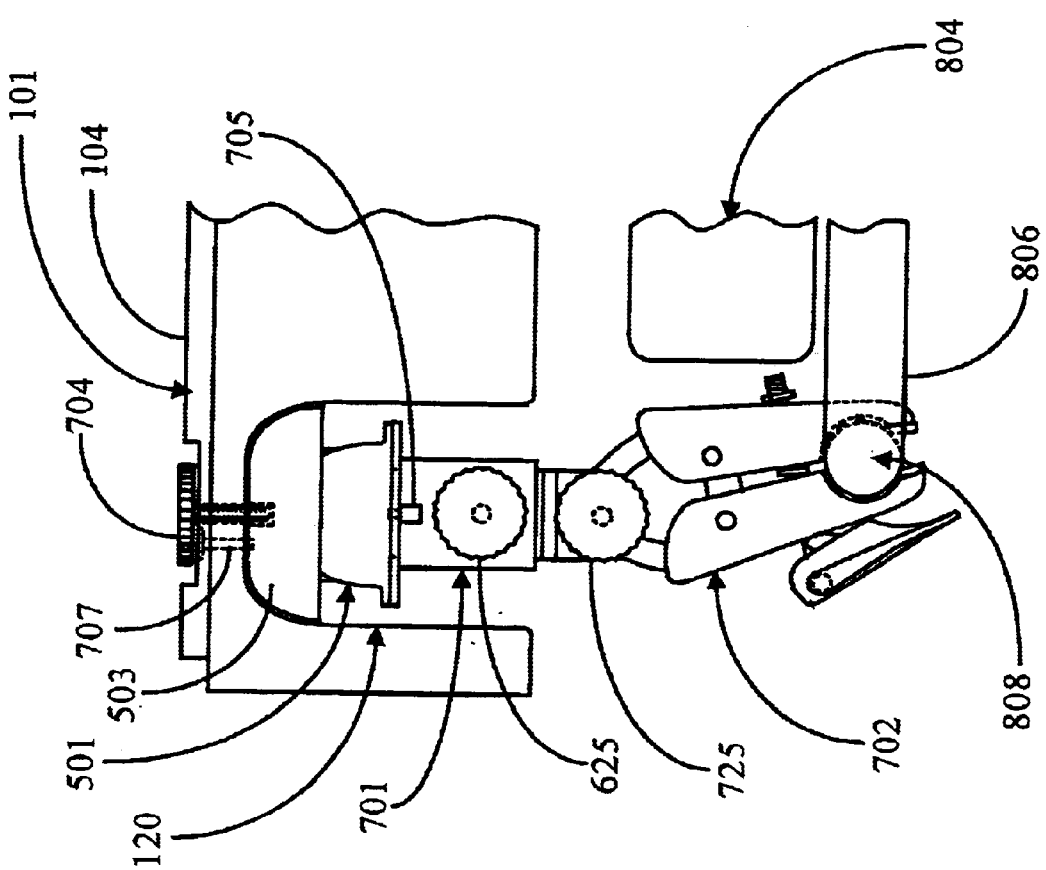

FIG. 8 is a broken elevation view of two clamp mount assemblies 701 of FIG. 7 attaching modular carrier 101 of FIG. 1a to a roll bar windshield assembly according to an embodiment of the present invention. A pair of clamp mount assemblies 701 in this illustration are securely clamped, using lockjaw assemblies 702, to a pair of vertical roll bars 808 of a roll bar windshield assembly 804 that is in a folded-down horizontal position in this view. A vertical roll bar 808 located on either side of roll bar windshield assembly 804, connected by horizontal roll bar 806 which in various makes, years and models of vehicles, may be somewhat longer or shorter than the width of the hood of the host vehicle. Clamp mount assemblies 701 are adjusted in this view to the position providing the optimal grip angle for lock jaw assemblies 702, based on the relationship between the clamping location of vertical roll bar 808 and the centered position of each elastomeric mounting interface 501 within mounting seats 120 of modular carrier 101 which has been located in the desired mounting location on the vehicle. All the adjustments of the clamp mount assemblies 701 utilized for mounting modular carrier 101 to roll bar windshield 804 are locked in place utilizing hand screws 625, 725 and bolts 705, and body 104 of modular carrier 101 is firmly attached to the elastomeric mounting interfaces 501 utilizing hand screws 704 that are securely tightened into the center holes of caps 503 of elastomeric clamp mounts 501. Pegs 707 are secured in position beneath hand screws 704, the protruding ends of pegs 707 inserted into a hole in each cap 503, preventing rotation of cap 503 within mounting seats 120.

Figure 9:
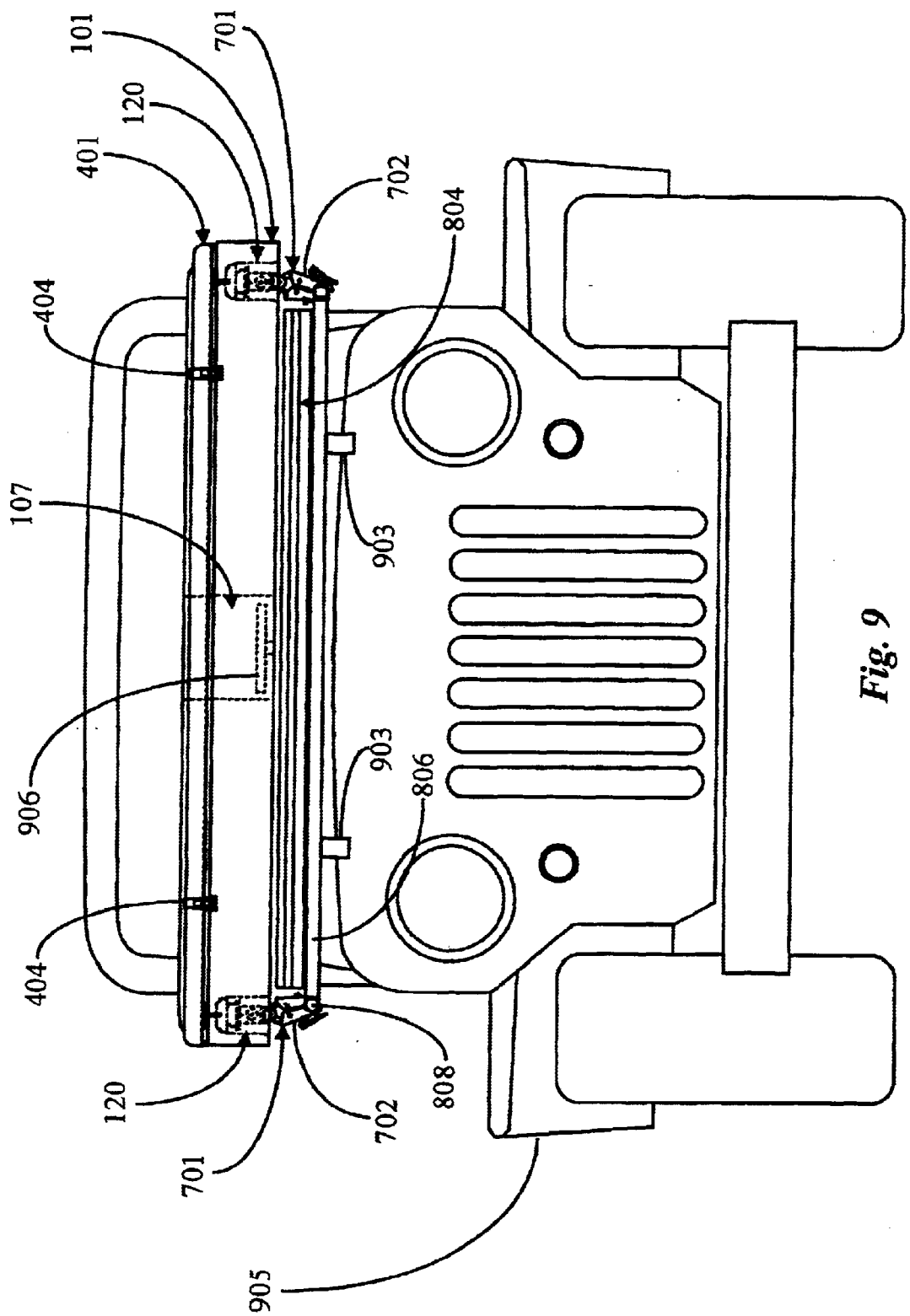
FIG. 9 is a front elevation view of an off-road vehicle and a modular utility storage system mounted to a roll bar windshield assembly according to an embodiment of the present invention.

FIG. 9 is a front elevation view of an off-road vehicle and a modular utility storage system mounted to a roll bar windshield assembly 804 of FIG. 8 according to an embodiment of the present invention. Modular carrier 101 of FIG. 1a is shown in this example mounted to roll bar windshield 804, which has been lowered to its folded down, horizontal position. Utilizing the method shown for FIG. 8, modular carrier 101 is shown in a preferred mounting location, forward of the driving compartment of the vehicle, above the hood of the vehicle, and is mounted to roll bar windshield 804 at four locations on roll bar 808, using a total of four clamp-mount assemblies 701 seated within the four mounting seats 120 of modular carrier 101. In this view, however, only the two forward clamp mount assemblies 701 and mounting seats 120 are visible, as the rearward clamp mount assemblies 701 and mounting seats 120 are hidden from view. Cutout 107 of hood box 101 is shown in the hidden view allowing clearance for a rear-view mirror 906 that is mounted on the upper portion of the windshield of roll bar windshield 804. Modular carrier lid 401 of FIG. 4a is shown seated upon hood box 101 and secured to the box 101 utilizing four lid clasps 404, only the forward two of which are shown in this view.

A pair of hood blocks 903 are shown in this application for supporting and securing roll bar windshield 804, and are attached to the hood of vehicle 905 at a location such that when roll bar windshield 804 is lowered to its horizontal position, the forward horizontal roll bar 806 of roll bar windshield 804 rests on or directly above hood blocks 903. Although details are not given for reasons of simplicity, hood blocks 903 have flexible and resilient properties for isolating roll bar windshield 804 and hood box 101 from vibration and shock, and also have a secure latching system for roll bar windshield 804 and possibly a locking mechanism. In other applications a rigid hood latching system may be utilized instead of a flexible system, diminishing little of the vibration-dampening properties of clamp mount assemblies 701.

As in FIG. 8, lockjaw assemblies 702 firmly grip vertical roll bars 808 at four locations, clamp mount assemblies 701 providing the flexible vibration-dampening mounting interface between modular carrier 101 and vertical roll bar 808. As is clearly illustrated in this view, lock jaw assemblies 702 of clamp mount assemblies 701 have been adjusted inward to facilitate the clamping operation. In other applications, depending upon the width of the roll bar windshield assembly to which hood box 101 will be clamped, lock jaw assemblies 702 may be pivotally adjusted inward or outward to best suit the clamping requirements of the application.

Figure 10:
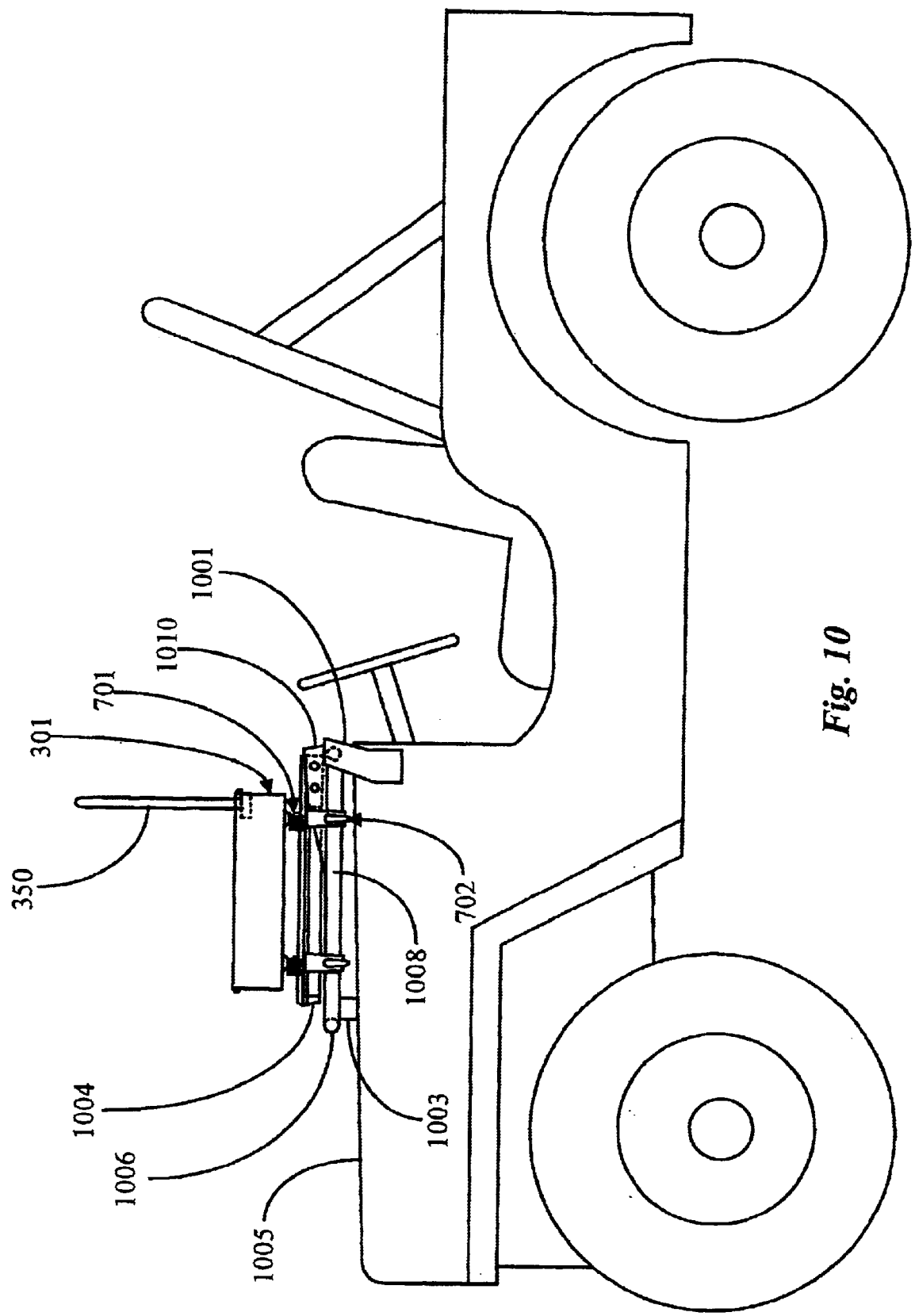
FIG. 10 is a side elevation view of an off-road vehicle and the mounted modular utility storage system of FIG. 3.

FIG. 10 is a side elevation view of an off-road vehicle and mounted modular utility storage system 301 of FIG. 3. In this view off-road vehicle 1005 is identical to off-road vehicle 905 of FIG. 9 except that the rear view mirror is not mounted on the windshield of the roll bar windshield assembly, as is true for vehicle 905 of FIG. 9. For off-road vehicle 1005 shown in this example, one, or a pair of rear-view mirrors are normally mounted at a side of the vehicle, as is the case for many older off-road vehicles of the type. For reasons of simplicity, however, such mirrors are not shown in this view.

In this view a clear perspective is given of a preferable mounting location for storage system 301, positioned directly in front of the passenger compartment of off-road vehicle 1005, and mounted to a folded-down roll bar windshield 1004. Roll bar windshield 1004, except for the omission of an attached rear-view mirror, is identical to roll bar windshield 804 of FIG. 9, having a vertical roll bar 1008 providing the clamping locations for lock jaw assemblies 702, and a horizontal roll bar 1006 spanning between vertical roll bars 1008. Roll bar windshield 1004 pivots on a windshield hinge assembly 1001, which is shown in this view to include a support bracket attached to the body of off-road vehicle 1005, and a windshield brace 1010 provides strength and stability to the assembly of roll bar windshield 1004. One of the two forward clamp mount assemblies 701, and one of the two rearward clamp mount assemblies 701 are seen in this view, as are the mounting seats 120 into which they are firmly seated and attached. Lock jaw assemblies 702 of clamp mount assemblies 701 are shown in their clamped position with the clamping handles flipped downward.

Hood blocks 1003, one of which is visible here, are shown in the typical location attached to the hood of vehicle 1005 and supporting roll bar windshield 1004. Hood blocks 1003 are identical in form and function to hood blocks 903 of FIG. 9, having the same properties such as resilience and flexibility, and a latching system with possibly a locking mechanism, as is the case for hood blocks 903 of FIG. 9.

Modular carrier 301 is shown in this view without a cover such as box lid 401 of FIG. 4, and shows support rail 350 in the upward position and locked in its vertical, upright position. In this upright position support rail 350 extends vertically to a height such that if, for example, the front passenger of the vehicle wishes to stand in the vehicle while it is in motion, to gain a better view of the surroundings for instance, the uppermost portion of support rail 350 is within easy reach of the standing passenger, providing a secure support onto which to hold for stability. Support rail 350 is designed so that the standing support provided can be utilized with equal success by either the passenger or driver of the vehicle.

Figure 11:
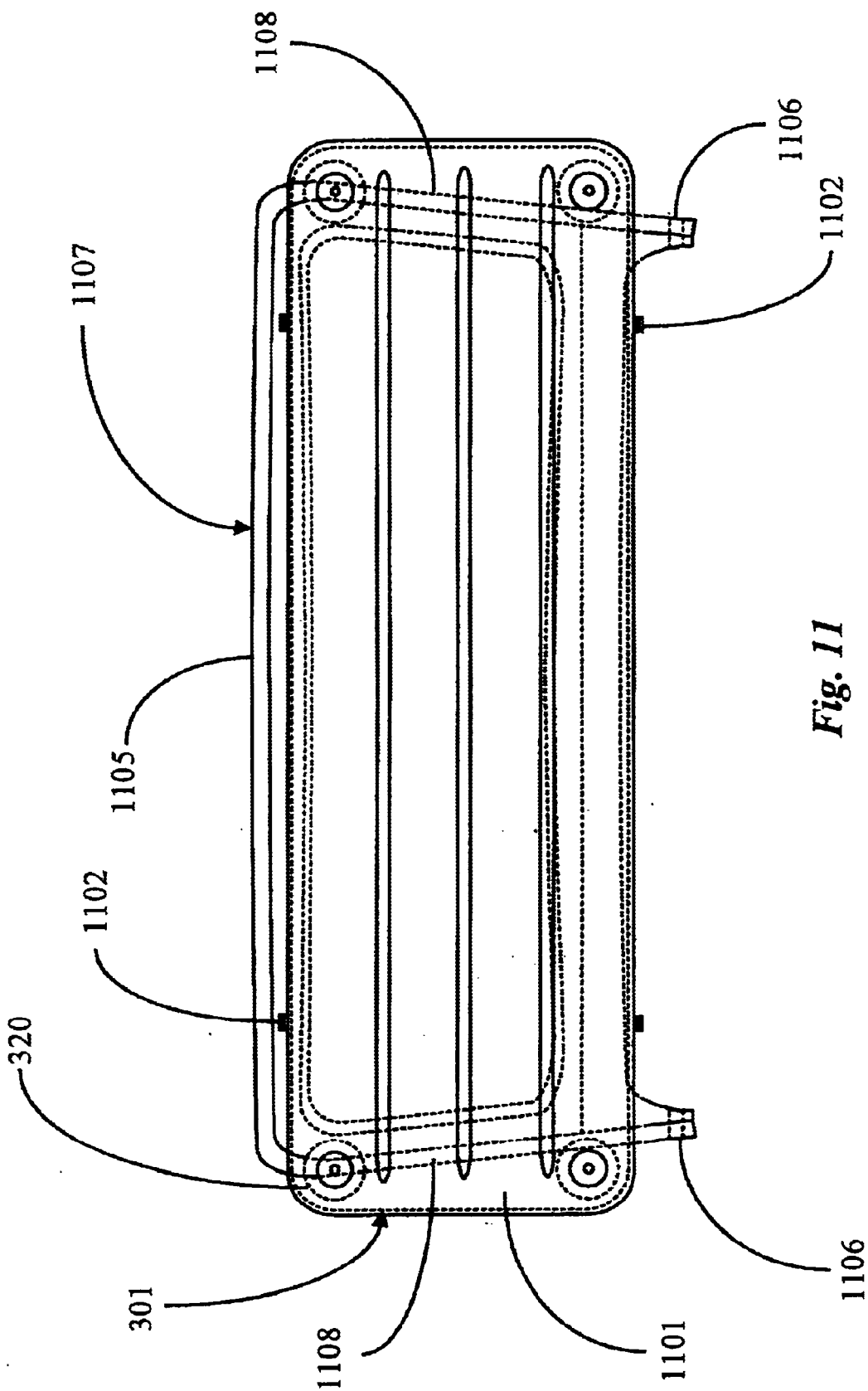
FIG. 11 is a plan view of the modular utility storage system of FIG. 3 with a cover, positioned on a windshield assembly according to an embodiment of the present invention.

FIG. 11 is a plan view of modular carrier 301 of FIG. 3 with a hood box cover, positioned on a windshield assembly according to an embodiment of the present invention. A purpose of FIG. 11 is to provide a clear perspective of a preferred mounting location on a folded-down windshield. Windshield 1107 is of the typical fold-down type commonly used for off-road vehicles, and differs from roll bar windshield 1004 of FIG. 10 in that, instead of being an assembly comprising a separate roll bar and windshield, windshield 1107, as is true for earlier off-road vehicles as well as recent models, is a windshield whose frame has the functionality of a roll bar incorporated into it. The support and protection of the roll bar is integrated into frame 1105 of windshield 1107, thereby forming an integral combination of the windshield and roll bar. Windshield 1107 is slightly wider at the top than at the bottom and has a vertical roll bar 1108 on each opposing side. Each side of the lower, narrower end of windshield 1107 has an extension 1106, extensions 1106 allowing attachment of windshield 1107 to a hinge or pivot point of the host vehicle.

Modular carrier 301 is shown in this view with a box lid 1101 installed and secured with a total of four lid clasps 1102, lid clasps 1102 being identical in form and function to lid clasps 404 of FIG. 4a. In the mounting position shown in this view, modular carrier 301 is roughly centered over windshield 1107, the four mounting seats 320, shown in the hidden view, located directly above the clamping positions located on each vertical roll bar 1108. Utilizing the mounting position shown for modular carrier 301, the clamp mount assemblies (not shown) that would be used for mounting would require different adjustments in order to achieve the best clamping angles. For example, since vertical roll bars 1108 are not parallel to each other, and the lower section of windshield 1107 is narrower than the upper section, the clamp mounts that would be used for clamping to the lower, narrower section would first be slightly rotatably adjusted within mounting seats 320, and then pivotally adjusted to reach the clamping position of each vertical roll bar 1108. Clamp mount assemblies that would be used for clamping modular carrier 301 to the upper, wider section of windshield 1107 would also require a slight rotatable adjustment, within mounting seat 320, to the same degree required by the lower clamp mount assemblies, but would not require a pivotal adjustment since mounting seats 320, in this configuration, are located directly above the clamping locations of vertical roll bars 1108.

It will be apparent to one with skill in the art that by utilizing the clamping and adjustment capabilities of a clamp mount assembly such as described herein, a user will be able to mount a modular carrier, such as has been shown and described in various embodiments, to a folded-down roll bar windshield assembly that may be of many shapes, sizes and types. It will also be apparent that, in addition to the adjustment capabilities provided by clamp mount assemblies as shown and described in various embodiments, further adjustability in the mounting system may be accomplished by various means in alternative embodiments of the present invention without departing from the main object of the invention. For example, by utilizing elongated mounting seats instead of round ones, a clamp mount assembly could be secured in different positions within the mounting seat. In other alternative embodiments a modular storage system may be mounted on a mounting interface that is attached to the folded-down windshield, and the interface allows for the modular storage system to then be adjusted for position, such as sliding it in a parallel or lateral direction, and then secured in place. It is an object of the invention to combine a flexible, versatile, vibration-dampening mounting system with a multiple-use, lightweight versatile modular utility carrier system that enables mounting out the modular storage system to a folded-down windshield assembly. Therefore, a variety of different flexible mounting systems and apparatus may be utilized to achieve this end without departing from the overall scope and spirit of the invention. The embodiments illustrated and described for a flexible, vibration-dampening mounting system are only examples thereof, representative of a variety of systems that may utilized in alternative embodiments of the present invention. For these reasons the invention should be afforded the broadest possible scope limited only by the claims that follow.

What is claimed is:

1. A modular utility carrier in combination with a folded down windshield assembly of a vehicle, comprising:
    a body tray having a length, width and height, the body tray formed by side walls and a bottom wall forming an upward-facing cavity; and
    a plurality of attachment assemblies connected to the body, each having an attachment interface to provide a releasable attachment to the folded-down windshield of the vehicle;
    wherein the attachment assemblies further comprise resilient mounting elements to at least partially shield the body tray from forces caused by movement of the vehicle.

2. The carrier of claim 1 wherein the attachment assemblies comprise clamp mechanisms to clamp to bar elements of the folded-down windshield.

3. The carrier of claim 1 wherein the attachment assemblies further comprise elongation mechanisms allowing the body tray to be positioned above the folded-down windshield at variable heights.

4. The carrier of claim 1 wherein the body tray comprises a plurality of compartments shaped and equipped to carry or store one or more elements of gear related to a specific activity.

5. The carrier of claim 4 wherein the activity is wildlife observation, and the elements comprise one or more of binoculars or cameras.

6. The carrier of claim 1 further comprising a lid closure shaped and equipped to close the cavity and protect articles within the cavity from exposure to conditions outside the carrier.

7. The carrier of claim 6 wherein the lid is secured to the tray body by latch elements and is completely removable.

8. A modular utility carrier to mount to a vehicle, comprising:
    a body tray having a length, width and height, the body tray formed by side walls and a bottom wall forming an upward-facing cavity, the body tray having a plurality of compartments shaped and equipped to carry or store at least one firearm; and
    a plurality of attachment assemblies connected to the body, each having an attachment interface to provide a releasable attachment to the folded-down windshield.

9. The carrier of claim 8 further comprising one or more tip-up gun rests for steadying a firearm during shooting.

10. A modular utility carrier in combination with a folded down windshield assembly of a to a vehicle, comprising:
    a body tray having a length, width and height, the body tray formed by side walls and a bottom wall forming an upward-facing cavity;
    a plurality of attachment assemblies connected to the body, each having an attachment interface to provide a releasable attachment to the folded-down windshield; and
    a tip-up steadying bar for a passenger in a vehicle to grasp while standing.

11. A modular utility carrier in combination with a folded down windshield assembly of a to a vehicle, comprising:
    a body tray having a length, width and height, the body tray formed by side walls and a bottom wall forming an upward-facing cavity, the body tray having a plurality of compartments shaped and equipped to carry or store one or more elements of gear related to a specific activity; and
    a plurality of attachment assemblies connected to the body, each having an attachment interface to provide a releasable attachment to the folded-down windshield;
    characterized in that individual ones of the compartments comprise one or more of protective linings, vibration damping elements, and fastening components for holding the elements in place.

12. A modular utility carrier in combination with a folded down windshield assembly of a to a vehicle, comprising;
    a body tray having a length, width and height, the body tray formed by side walls and a bottom wall forming an upward-facing cavity;
    a plurality of attachment assemblies connected to the body and each having an attachment interface to provide a releasable attachment to the folded-down windshield; and
    one or more insert trays shaped and sized to fit snugly within the upward-facing cavity of the body tray, such that insert trays are interchangeable in the body tray.

13. The carrier of claim 12 further comprising vibration-dampening elements interposed between the body tray and the insert tray.

14. The carrier of claim 12 wherein the insert tray comprises a plurality of compartments shaped and equipped to carry or store one or more elements of gear related to a specific activity.

15. The carrier of claim 14 wherein the activity is hunting, and the elements comprise at least one firearm used in hunting.

16. The carrier of claim 14 wherein the activity is wildlife observation, and the elements comprise one or more of binoculars and cameras.

17. The carrier of claim 14 wherein individual ones of the compartments comprise one or more of protective linings, vibration damping elements, and fastening components for holding the elements in place.

18. The carrier of claim 12 further comprising a plurality of secondary tray modules shaped to fit into and be carried by the insert tray, individual ones of the secondary tray modules shaped and equipped to store one or more elements related to an activity.

19. The carrier of claim 18 wherein the activity is hunting, and the elements comprise at least one firearm used in hunting.

20. The carrier of claim 19 wherein the activity is wildlife observation, and the elements comprise one or more of binoculars and cameras.

21. The carrier of claim 18 wherein individual ones of the secondary tray modules comprise one or more of protective linings, vibration damping elements, and fastening components for holding the elements in place.

* * * * *